(12) United States Patent
Jang

(10) Patent No.: US 12,703,221 B2
(45) Date of Patent: Aug. 11, 2026

(54) STABILIZER FOR VEHICLE

(71) Applicant: Soon Gil Jang, Seoul (KR)

(72) Inventor: Soon Gil Jang, Seoul (KR)

( * ) Notice: Subject to any disclaimer, the term of this patent is extended or adjusted under 35 U.S.C. 154(b) by 85 days.

(21) Appl. No.: 18/349,230

(22) Filed: Jul. 10, 2023

(65) Prior Publication Data

US 2023/0347704 A1 Nov. 2, 2023

Related U.S. Application Data

(63) Continuation of application No. 17/384,625, filed on Jul. 23, 2021, now Pat. No. 11,731,481, which is a (Continued)

(30) Foreign Application Priority Data

Jan. 26, 2019 (KR) ........................ 10-2019-0010215
Jun. 22, 2019 (KR) ........................ 10-2019-0074663

(51) Int. Cl.
*B60G 21/055* (2006.01)
*B60G 17/02* (2006.01)
*B62D 7/18* (2006.01)

(52) U.S. Cl.
CPC ....... *B60G 21/055* (2013.01); *B60G 21/0558* (2013.01); *B62D 7/18* (2013.01); *B60G 17/025* (2013.01); *B60G 2200/17* (2013.01); *B60G 2202/12* (2013.01); *B60G 2204/1224* (2013.01); *B60G 2204/419* (2013.01); *B60G 2204/422* (2013.01); *B60G 2206/427* (2013.01); *B60G 2206/50* (2013.01); *B60G 2500/22* (2013.01)

(58) Field of Classification Search
CPC .............. B60G 21/055; B60G 2202/12; B60G 2204/419; B60G 2204/422; B60G 2206/427; B60G 2206/50; B60G 2200/17; B60G 21/0558; B60G 17/025; B60G 2204/1224; B60G 2500/22; B62D 7/18
See application file for complete search history.

(56) References Cited

U.S. PATENT DOCUMENTS 1,373,109 A * 3/1921 Twinberrow ......... B60G 21/055 267/188
1,963,690 A * 6/1934 Backdahl ........... B60G 21/0553 105/199.2

(Continued)

FOREIGN PATENT DOCUMENTS

JP 2006-347271 A 12/2006
KR 20-1997-0008518 U 3/1997

(Continued)

*Primary Examiner* — Timothy Wilhelm
(74) *Attorney, Agent, or Firm* — NKL LAW; Jae Youn Kim

(57) ABSTRACT

There is provided a stabilizer for a vehicle, including a torsion bar fixed to a car body and configured to be rotated about a longitudinal axis of rotation without changing a position, two arm links connected to both ends of the torsion bar, and two drive links connected to each of the two arm links through a ball joint so as to be able to be rotated three-dimensionally, in which the two drive links are configured to, during cornering of the vehicle, adjust a degree of torsion of the torsion bar by rotating about an axis of rotation of a strut assembly or a steering knuckle connected to the two drive links.

5 Claims, 28 Drawing Sheets

Related U.S. Application Data continuation-in-part of application No. PCT/KR2020/000915, filed on Jan. 20, 2020.

(56) References Cited

U.S. PATENT DOCUMENTS

| | | | | |
|---|---|---|---|---|
| 2,536,769 A * | 1/1951 | Rix | B60G 11/50 | 280/124.167 |
| 2,784,964 A * | 3/1957 | Linn | B60G 21/055 | 267/190 |
| 3,236,514 A * | 2/1966 | Van Winsen | B60G 99/00 | 267/193 |
| 3,337,236 A * | 8/1967 | Peterson | B60G 21/0553 | 280/124.101 |
| 3,490,786 A * | 1/1970 | Ravenel | B60G 17/0277 | 280/124.101 |
| 3,498,631 A * | 3/1970 | Van Winsen | B60G 21/0551 | 280/124.153 |
| 3,589,700 A * | 6/1971 | Ruet | B60G 21/055 | 267/221 |
| 4,094,532 A * | 6/1978 | Johnson | F16F 1/16 | 267/284 |
| 4,415,178 A * | 11/1983 | Hatsushi | B60G 21/05 | 280/124.152 |
| 4,544,180 A * | 10/1985 | Maru | B60G 11/183 | 280/124.106 |
| 4,691,582 A * | 9/1987 | Weyer | F16H 25/2204 | 74/89.42 |
| 4,722,546 A * | 2/1988 | Asami | B60G 17/0165 | 280/5.517 |
| 4,842,298 A * | 6/1989 | Jarvis | F16F 1/14 | 280/124.152 |
| 5,005,859 A * | 4/1991 | Satoh | B60G 15/06 | 280/124.152 |
| 5,074,581 A * | 12/1991 | Matsuoka | F16F 9/145 | 280/124.13 |
| 5,074,582 A * | 12/1991 | Parsons | B60G 21/05 | 267/274 |
| 5,288,101 A * | 2/1994 | Minnett | B60G 21/0558 | 280/5.511 |
| 5,368,326 A * | 11/1994 | Turck | B60G 21/0551 | 267/277 |
| 5,496,055 A * | 3/1996 | Shibahata | B62D 7/18 | 280/124.141 |
| 5,556,083 A * | 9/1996 | Furihata | F16F 1/14 | 280/124.101 |
| 5,700,027 A * | 12/1997 | Schiffler | B60G 21/0555 | 280/124.162 |
| 5,839,741 A * | 11/1998 | Heyring | B60G 21/04 | 280/124.167 |
| 5,839,742 A * | 11/1998 | Holt | B60G 13/14 | 267/248 |
| 6,152,467 A * | 11/2000 | Alesso | B60G 3/225 | 280/124.13 |
| 6,217,047 B1 * | 4/2001 | Heyring | B60G 21/073 | 280/124.106 |
| 6,428,019 B1 * | 8/2002 | Kincad | F16D 11/10 | 280/124.152 |
| 6,467,784 B1 * | 10/2002 | Kim | B60G 21/05 | 280/93.51 |
| 6,481,732 B1 * | 11/2002 | Hawkins | B60G 17/0162 | 280/124.106 |
| 6,513,819 B1 * | 2/2003 | Oliver | B60G 21/0553 | 280/124.152 |
| 6,530,586 B2 * | 3/2003 | Fader | B60G 21/0556 | 280/124.152 |
| 6,698,767 B2 * | 3/2004 | Hagan | B60G 9/00 | 280/5.511 |
| 6,779,806 B1 * | 8/2004 | Breitbach | B60G 11/20 | 280/124.13 |
| 6,789,813 B2 * | 9/2004 | Schmidt | B60G 21/055 | 280/124.165 |
| 6,945,522 B2 * | 9/2005 | Eshelman | B60G 17/025 | 267/273 |
| 7,237,785 B2 | 7/2007 | Kraus et al. | | |
| 7,284,633 B2 * | 10/2007 | Bordini | B60G 21/051 | 180/348 |
| 7,293,780 B2 * | 11/2007 | Germain | B60G 21/0553 | 280/5.506 |
| 7,530,584 B2 * | 5/2009 | Drinan | B60G 21/0553 | 280/124.107 |
| 7,543,833 B2 * | 6/2009 | Lundmark | B62D 7/20 | 280/124.13 |
| 7,559,562 B2 | 7/2009 | Minoshima | | |
| 7,725,226 B2 * | 5/2010 | Urababa | B60G 21/0555 | 280/5.506 |
| 7,815,205 B2 * | 10/2010 | Barth | B60G 21/0558 | 280/124.107 |
| 7,896,360 B2 * | 3/2011 | Buma | B60G 17/0161 | 280/5.502 |
| 8,167,319 B2 * | 5/2012 | Ogawa | B60G 21/0553 | 280/5.511 |
| 8,282,115 B2 * | 10/2012 | Stephani | B60G 21/051 | 280/124.109 |
| 8,505,938 B2 * | 8/2013 | King | B60G 3/20 | 280/124.152 |
| 8,608,186 B2 * | 12/2013 | Lee | B60G 17/0162 | 280/5.506 |
| 8,616,569 B2 * | 12/2013 | Ohletz | B60G 17/025 | 280/124.13 |
| 8,746,705 B1 * | 6/2014 | Kim | B60G 7/001 | 280/124.152 |
| 8,851,490 B2 * | 10/2014 | Berheide | B60G 11/183 | 280/124.152 |
| 8,870,191 B2 * | 10/2014 | Lee | B60G 21/0553 | 280/5.511 |
| 9,016,703 B2 * | 4/2015 | Rowe | B60G 7/008 | 267/273 |
| 9,409,459 B2 * | 8/2016 | Solbrack | B60G 17/015 | |
| 9,416,849 B2 * | 8/2016 | Park | B60G 21/0555 | |
| 9,463,680 B2 * | 10/2016 | Miyamoto | B60G 21/0558 | |
| 9,586,457 B2 * | 3/2017 | Jeon | B60G 21/0556 | |
| 9,751,375 B2 * | 9/2017 | Muschler | B60G 21/05 | |
| 9,878,589 B2 * | 1/2018 | Park | B60G 21/0556 | |
| 9,895,952 B2 * | 2/2018 | Miyamoto | B60G 21/0558 | |
| 10,246,149 B2 * | 4/2019 | Schindler | B60G 17/025 | |
| 10,336,153 B2 * | 7/2019 | Seong | B60G 21/005 | |
| 10,363,972 B2 * | 7/2019 | Yamazaki | B60G 21/073 | |
| 10,495,171 B1 * | 12/2019 | Keefe | F16F 1/145 | |
| 11,247,526 B2 * | 2/2022 | Klank | B60G 21/10 | |
| 11,390,133 B2 * | 7/2022 | Cox | B60G 21/0556 | |
| 2010/0072723 A1 * | 3/2010 | Ciasulli | B60G 21/055 | 280/124.106 |
| 2011/0037239 A1 * | 2/2011 | Mori | B60G 21/0555 | 280/124.106 |
| 2012/0061934 A1 * | 3/2012 | Scaduto | B60G 11/181 | 280/124.106 |
| 2017/0129303 A1 * | 5/2017 | Park | B60G 21/0558 | |

FOREIGN PATENT DOCUMENTS

| | | |
|---|---|---|
| KR | 10-2000-0074378 A | 12/2000 |
| KR | 10-2003-0083111 A | 10/2003 |
| KR | 10-2008-0109972 A | 12/2008 |
| KR | 10-0916795 B1 | 9/2009 |
| KR | 10-0962200 B1 | 6/2010 |
| KR | 10-2012-0012205 A | 2/2012 |
| KR | 10-1198800 B1 | 11/2012 |
| KR | 10-1317374 B1 | 10/2013 |
| KR | 10-1393561 B1 | 5/2014 |
| KR | 10-1448796 B1 | 10/2014 |
| KR | 10-1592349 B1 | 2/2016 |
| KR | 10-2016-0059226 A | 5/2016 |
| KR | 10-2017-0095073 A | 8/2017 |
| KR | 10-2018-0057808 A | 5/2018 |

* cited by examiner

Fig.1
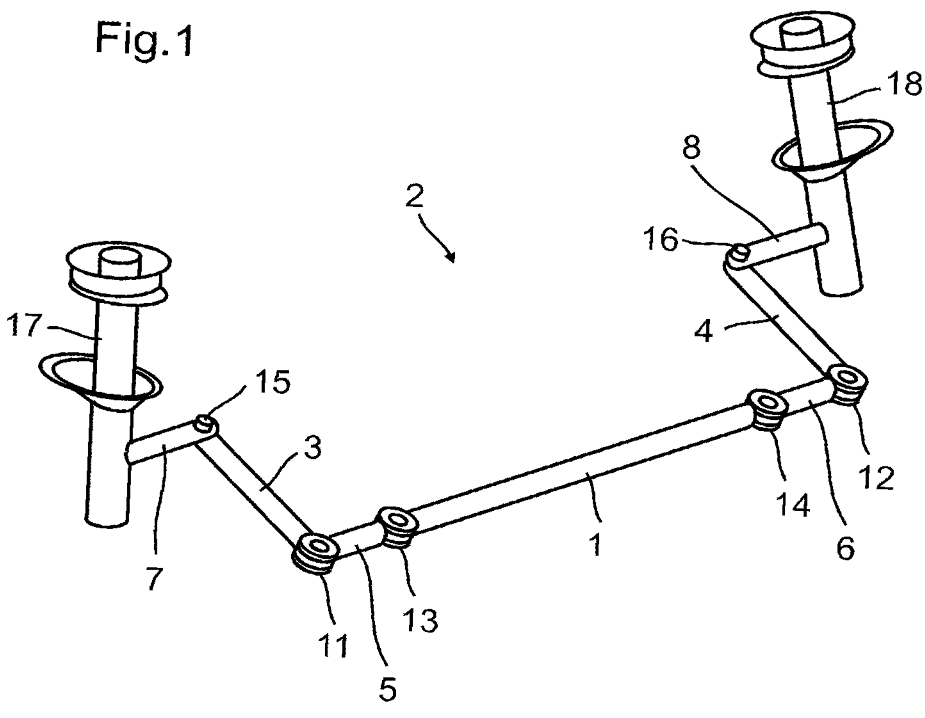
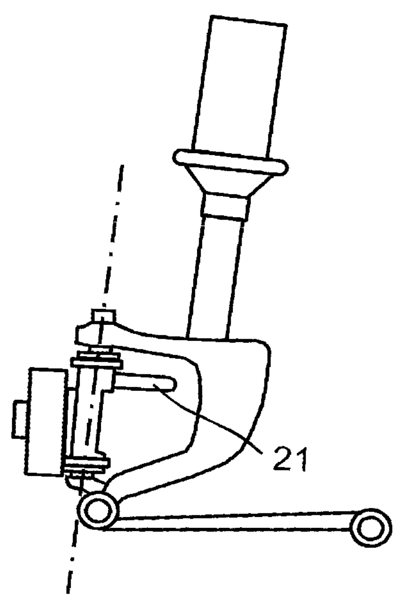
Fig.2A 82
90
84
88
80b
81a
89
83
86
87
80a
85
81

STABILIZER FOR VEHICLE

TECHNICAL FIELD

The present disclosure relates to a stabilizer for a vehicle, and more particularly, to a stabilizer for a vehicle and a device for fixing the stabilizer to the vehicle.

BACKGROUND

In general, when a car is in a balanced state that its posture is maintained in a stable state, the car body maintains stability on springs installed in various parts that support the same. During cornering, or acceleration or deceleration of the car in the balanced state, each of the wheels of the car is subjected to a centrifugal or inertial force in addition to the existing distributed load. The action of this centrifugal or inertial force may increase or decrease from the existing load (e.g., the load of a car, occupant, baggage, and the like) according to the direction of the force and the position of the wheels. Accordingly, the car is tilted to the direction of the wheel where the load increases. As a result, the car is tilted left and right or forward and backward.

In addition, regarding the stabilizer, there may be the situation where the car in the balanced state tilts left or right (hereinafter referred to as 'roll") or tilts forward or backward (hereinafter referred to as "pitch") by the application of the centrifugal or inertial force. In this case, in order to reduce the shaking of the car left and right (hereinafter referred to as "rolling") or the shaking back and forth (hereinafter referred to as "pitching"), a stabilizer installed between two wheels may serve to prevent the springs of the corresponding wheels from easily moving independently of each other. The higher the torsional rigidity of the stabilizer bar, the smaller the torsion occurs and the more likely the springs connected to the two wheels to be compressed to the same length, and accordingly, this makes the car rolls or pitches less. However, the higher the torsional rigidity of the stabilizer bar, the more likely the springs of both wheels be compressed to the same length. For this reason, when one wheel goes over an obstacle, the impact from the obstacle is not limited to the wheel where the hitting occurred, but also affects the other wheel connected to the stabilizer, resulting in a problem of increasing influence on the car body.

In addition, the stabilizer of the car is a device that improves the resistance to the roll or pitch of the car by using the torsional elasticity of a torsion bar. However, the related stabilizer undermines the independence of the suspension system of each wheel in the process of improving the resistance by using the torsional elasticity of the torsion bar. For example, when one wheel goes over an obstacle in the balanced state of the car, the car receives the impact caused by the obstacle, and the impact may act on the spring of the corresponding wheel. The spring is compressed in the balanced state according to the distributed load applied to each wheel, and as the spring is subjected to the impact, the spring repeats compressing and decompressing, thus leading to a vibration, and for this, attenuation by a shock absorber is occurred, while a portion of the impact is transferred to the vehicle at the same time. However, with the related stabilizer, it is difficult to block the impact generated from the one wheel going over the obstacle from influencing the other wheel.

Therefore, the related stabilizer has difficulties and limitations in making improvements in reducing the rolling or pitching of a car subjected to centrifugal or inertial force by adjusting torsional rigidity, and reducing the influence of an impact on one wheel by an obstacle on the car body at the same time. In addition, the related device for fixing a stabilizer bar has problems such as noise, lubrication, slippage, and the like. In order to overcome the above, various attempts have been made to make improvements, such as improving the shape or bushing of the stabilizer bar, installing a stopper, and the like.

SUMMARY

An object of the present disclosure is to improve the structure of a stabilizer bar positioned between left and right wheels of a car so that, during straight-driving of the car, there is less torsion of the stabilizer bar and less generation of the torque, thereby flexibly responding to the impact generated when the wheel goes over an obstacle. In addition, another object of the present disclosure is to twist the stabilizer bar to a greater extent to increase torque generation during cornering of the car, so that the force resulting from the torque of the stabilizer bar acts more strongly on an outside wheel spring of the turn than on an inside wheel spring of the turn, and also to make the outside wheel spring longer than the inside wheel spring to reduce the roll caused by centrifugal force or make the car tilt in a direction opposite to the centrifugal force.

According to the present disclosure, the structure of the stabilizer bar between the front and rear wheels of the car is improved so that the torsion of the stabilizer bar is less and the torque generation is reduced during steady driving, thereby flexibly responding to the impact generated when the wheel goes over an obstacle. In addition, during deceleration of the car, the stabilizer bar is twisted to a greater extent to increase the torque generation, thus making the spring of the front wheel longer than the spring of the rear wheel, and during acceleration, the stabilizer bar is twisted to a greater extent to increase the torque generation, thus making the spring of the rear wheel longer than the spring of the front wheel. Further, according to the present disclosure, the pitch by the inertial force is reduced, or the car is tilted in the opposite direction to the application of the pitch by the inertial force.

According to the present disclosure, a method of keeping the outside wheel spring at a closer distance to the torsion bar than the inside wheel spring is used, whereby the force from the torque of the stabilizer bar acts more strongly on the outside wheel spring of the turn than on the inside wheel spring of the turn during cornering of the car. According to this method, the smaller the turning radius of the car, the greater the difference in the distances. Specifically, installing a drive link at a position where the wheels are rotated along a kingpin centerline connected thereto can result in a change in the distance between the kingpin centerlines of the inside and outside wheel springs and the torsion bar according to a rotation of the drive link. In addition, in order to make the outside wheel spring of the turn longer than the inside wheel spring of the turn during cornering of the car, both arm portions of the stabilizer bar are positioned side by side in a parallel state during straight-driving of the car. Meanwhile, a method of making both arm portions of the stabilizer bar be twisted to each other is used during cornering of the car. The smaller the turning radius of the car, the greater the degree of relative twisting of both arm portions of the stabilizer bar.

In the present disclosure, in order to make the spring of the front wheel longer than the spring of the rear wheel during deceleration of the car, both arm portions of the stabilizer bar are positioned side by side in a parallel state during straight-driving of the car. In this state, a method of making both arm portions of the stabilizer bar twisted to each other is used. The greater the deceleration, the greater the degree of relative twisting of both arm portions of the stabilizer bar. Likewise, in order to make the spring of the rear wheel longer than the spring of the front wheel during acceleration of the car, both arm portions of the stabilizer bar are positioned side by side in a parallel state during straight-driving of the car. In this state, a method of making both arm portions of the stabilizer bar twisted to each other is used. The greater the acceleration, the greater the degree of relative twisting of both arm portions of the stabilizer bar.

According to the present disclosure, when the torsional rigidity of the stabilizer bar is added to the spring rigidity of the wheel, the overall rigidity is adjusted by adjusting the distance over which the torsional rigidity is acting, and accordingly, since a high rigidity of the stabilizer bar may reduce the riding comfort, if necessary (e.g., during straight-driving of the car at a steady driving), the stabilizer bar itself may be implemented to make the rigidity lower.

According to the present disclosure, there are three methods of making both arm portions of the stabilizer bar be, starting from a state parallel to each other, and gradually increasing a degree of twisting. These include a method of using a 4-section link, a method of using a 3-section link and a method of using a spline shaft control device. When using the 4-section link and the 3-section link, instead of having all the links move on one plane, they are configured to move separately on two planes intersecting each other so as to change the angle at which the two planes meet. When this change occurs at both ends of the stabilizer bar, an angular difference occurs between the links connected to both ends, causing the stabilizer bar to be twisted. When using a spline shaft control device, the torsion bar portion of the stabilizer bar may be separated into two portions, and helical spline gears may be mounted on the two separated portions, and the two helical spline gears may be connected through a boss. Then by adjusting the position of the boss in the axial direction, a degree of the relative torsion of the two helical spline gears may be adjusted.

In the present disclosure, a method is used, in which the stabilizer bar is divided into a high-rigidity portion and a low-rigidity portion, and an elastic control device is formed with a spline shaft and a boss to adjust a length of the low-rigidity portion serving as the stabilizer bar to thus adjust an elasticity of the stabilizer bar. The longer the length of the low-rigidity portion serving as the stabilizer, the lower the overall elasticity of the stabilizer.

In the present disclosure, the method of using the 4-section link and the method of using the 3-section link may be used independently of the method of using the spline shaft control device or the method of using the elastic control device, respectively, although they may be used in combination with the spline shaft control device or the elastic control device at the same time. Since the stabilizer bar requires only a small amount of rotation within a predetermined range of angle at a fixed position, the stabilizer bar fixing device according to the present disclosure may use a method of fixing the stabilizer bar with a spring to allow a small amount of rotation.

According to an embodiment of the present disclosure, a stabilizer for a vehicle may include a torsion bar fixed to a car body and configured to be rotated about a longitudinal axis of rotation without changing a position, two arm links connected to both ends of the torsion bar, and two drive links connected to each of the two arm links through a ball joint so as to be able to be rotated three-dimensionally, in which the two drive links may be configured to, during cornering of the car, adjust a degree of torsion of the torsion bar by rotating about an axis of rotation of a strut assembly or a steering knuckle connected to the two drive links.

In one embodiment, the stabilizer may further include: two arm link hinges configured to be moved forward or backward of the car body according to a movement of the two arm links; torsion links positioned at both ends of the torsion bar and configured between the arm link hinges connected to the torsion bar; and at least one torsion link hinge configured to connect the torsion bar and the torsion link to be moved forward or backward of the car body.

In one embodiment, one end of each of the two arm links is connected to one and other ends of the torsion bar through an arm link sliding hinge, and each of the two arm links is movable via the arm link sliding hinge in a direction orthogonal to a longitudinal direction of the torsion bar.

In one embodiment, the arm link sliding hinge, through which the arm link is passed, includes a sleeve configured to adjust length.

According to another embodiment of the present disclosure, a stabilizer for a vehicle may include a spline shaft control device fixed to a car body; a first and second torsion bar portions connected to both ends of the spline shaft control device; two arm portions integrally connected to the first torsion bar portion and the second torsion bar portion, respectively; and two links respectively connected to the two arm portions, wherein a first spline gear is formed at one end of the first torsion bar portion, a second spline gear is formed at one end of the second torsion bar portion, the spline shaft control device includes a control boss configured such that the first spline gear and the second spline gear are inserted into and engaged within one and other ends thereof, respectively, and the first spline gear and the second spline gear are configured to maintain a predetermined interval within the control boss, and as the control boss is moved in an axial direction, additional torsion is further generated between the first spline gear and the second spline gear.

In one embodiment, the spline shaft control device may further include: a control boss carrier rail having a rail-shaped groove formed on one surface; a control boss carrier mounted in the groove of the control boss carrier rail and configured to move in the axial direction; and a control boss carrier drive rod configured to be connected to a drive device to move the control boss carrier rail in the axial direction.

In one embodiment, the first spline gear is configured in a form of a helical spline gear and is configured to be engaged within one side of the control boss, the second spline gear is configured in a form of a helical spline gear in an opposite direction to the first spline gear and is configured to be engaged within the other side of the control boss, and the control boss is configured such that a twist is formed between the first and second spline gears as the control boss is moved between the first and second spline gears.

In one embodiment, the second spline gear is configured to have a length different from that of the first spline gear, and the first and second spline gears are engaged with and inserted by different lengths from each other into both ends of the control boss.

In one embodiment, the first spline gear is configured to have narrower valleys and deeper grooves than the second spline gear, such that by adjusting effective radius of a width of the first spline gear to be small, an elastic modulus is lowered to enable the first spline gear to resist a force caused by torsion.

According to another embodiment of the present disclosure, a device for fixing a stabilizer to a car body, may include: a spring configured to transmit a rotational force to torsion bar portions of the stabilizer that are passed therethrough and connected therein, and provide a supporting force in a three-dimensional direction to fix the torsion bar portions to the car body; and a bracket configured to be coupled to the torsion bar portions to fix the spring to the car body.

According to some embodiments, the stabilizer uses a simple structure that can be implemented at a low cost. Such stabilizer can be installed between two pairing wheels either at a front side or at a rear side or installed between front and rear wheels.

According to some embodiments, by making it possible to adjust the elasticity of the stabilizer bar, it is possible to reduce the roll or pitch of the car due to centrifugal or inertial force or tilt the car in the opposite direction to the centrifugal or inertial force to improve riding comfort during cornering or acceleration/deceleration of the car, thereby improving riding comfort.

According to some embodiments, the stabilizer bar fixing device uses a method of using a spring to fix the stabilizer to the car body, to simultaneously serve as a spring that helps the suspension system and serve to fix the stabilizer bar without shortcomings such as noise, lubrication, and slippage, thereby improving riding comfort.

According to some embodiments, the helical torsion spring and the torsion coil spring allow the torsion of the stabilizer, but do not use or allow slipping, so that lubrication is not required and noise may not be generated during torsion.

BRIEF DESCRIPTION OF THE DRAWINGS

FIG. 1 is a perspective view illustrating a 4-section link stabilizer according to an embodiment of the present disclosure.

FIGS. 2A to 2C are views illustrating examples in which the drive links of FIG. 1 are connected to various types of steering knuckles.

FIG. 13C is a cross-sectional view illustrating examples of the cross-sectional shape of the left spline gear in the elastic control device of FIG. 13A.

DETAILED DESCRIPTION OF THE INVENTION

Figure 2B:
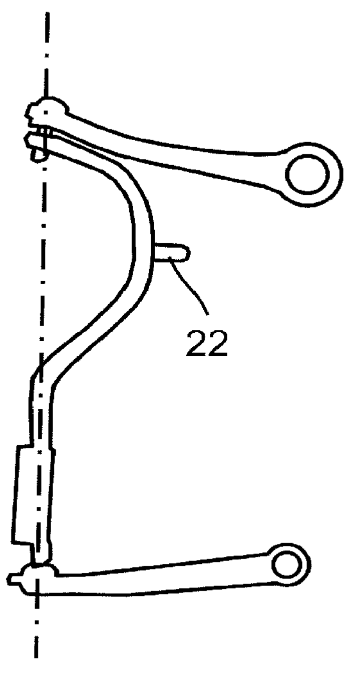

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

In the present disclosure, a "hinge" may be configured to rotate with respect to an axis or a pin at a center thereof, and may be a type of device that allows no clearance or bending except in the direction of rotation.

In the present disclosure, a "ball joint" may refer to a connection device that is free to rotate and bend, and may be replaceable with other devices that can perform the same function.

In the present disclosure, "straight-driving" refers to when a car is driving straight forward, and "backward-driving" refers to when a car is driving backward. In addition, "left-cornering" refers to when a car is cornering along a road that curves to the left, and "right-cornering" refers to when a car is cornering along a road that curves to the right, and the "left-cornering" and "right-cornering" will be collectively referred to as "cornering".

In the present disclosure, "acceleration" refers to when a car is gradually increasing the speed, and "deceleration" refers to when a car is gradually decreasing the speed. In addition, "acceleration/deceleration" collectively refers to the acceleration and deceleration, and "steady-driving" refers to when a car is traveling at a steady speed without acceleration/deceleration. In the present disclosure, during constant- and straight-driving of a car on a road free of obstacles, the total weight of the loads including the car, passengers, luggage, and the like is distributed and applied to several wheels, and the car has a posture maintained in a stable state, which is referred to as a "balanced state".

In the present disclosure, when a car is cornering in the balanced state, since the centrifugal force acts in the direction from the inside wheel of the turn to the outside wheel of the turn, the load on the outside wheel of the turn increases and the load on the inside wheel decreases, so that the car may be likely to tilt outward. As described above, "roll" refers to when the car tilts left or right, "rolling" refers to when the car sways left and right.

During acceleration of the car in the balanced state, inertial force acts backward, resulting in an increase in load on the rear wheel and a decrease on the front wheel, which may cause the car to tilt backward. Conversely, during deceleration of the car in the balanced state, the inertial force acts forward, resulting in an increase in load on the front wheel and a decrease on the rear wheel, which may cause the car to tilt forward. "Pitch" refers to when the car is tilted forward or backward, "pitching" refers to when the car sways back and forth.

In the present disclosure, "inside wheel" during cornering or turn of a car may refer to a wheel closer to a center of the turn, and "outside wheel" may refer to a wheel positioned on the outside of the center of the turn more than the inside wheel.

In the present disclosure, when the torsion bar is twisted by an application of force to one end thereof, the torque is transmitted to the other end, with the torque or moment being expressed as $\tau = r \times F$. Here, $\tau$ may be a moment, r may be a distance from an axis of rotation to a position where the force is applied, and F may be an applied force. As described above, it can be seen that the force F varies according to the distance r even with the same magnitude of torque $\tau$.

FIG. 1 is a perspective view illustrating a 4-section link stabilizer according to an embodiment of the present disclosure. As illustrated, a 4-section link stabilizer 2 may include a torsion bar 1, arm links 3 and 4 and torsion links 5 and 6. The torsion bar 1 may be fixed to the car body via a fixing device (not illustrated) and rotated about an axis of rotation in the longitudinal direction without changing a position. Arm link hinges 11 and 12 may be configured to be moved forward or backward of the car according to the movement of each of the two arm links 3 and 4. The torsion links 5 and 6 may be connected to both ends of the torsion bar 1 via torsion link hinges 13 and 14, and may be positioned between the torsion bar 1 and the arm links 3 and 4. The torsion link hinges 13 and 14 may be configured to connect the torsion bar 1 and the torsion links 5 and 6 so that the torsion links 5 and 6 can be moved forward or backward of the car body. Drive links 7 and 8 connected to strut assemblies 17 and 18 may be rotated together as the strut assemblies 17 and 18 are rotated. The two arm links 3 and 4 may be connected to both ends of the torsion bar 1 via the torsion links 5 and 6, and the two drive links 7 and 8 may be connected to the two arm links 3 and 4, respectively via ball joints 15 and 16 to enable a three-dimensional rotation. As an example, during cornering of the car, the two drive links 7 and 8 may be configured to move the arm links 3 and 4 and the torsion links 5 and 6 forward or backward of the car body, thereby adjusting the degree of torsion of the torsion bar 1 as the strut assemblies 17 and 18 or steering knuckle (as illustrated in FIGS. 2A-2C) connected to the two drive links 7 and 8 are rotated about the axis of rotation thereof.

When compared with the torsion bar and arm portion of the related stabilizer bar, the torsion bar 1 and the torsion links 5 and 6 may correspond to the torsion bars of the related stabilizer, and the arm links 3 and 4 may play a corresponding role of the arm portions of the related stabilizer. The ball joints 15 and 16 may be configured to be rotatable, and may also be bendable in all directions. In addition, the arm link hinges 11 and 12 and the torsion link hinges 13 and 14 may be rotated about pins for fixing the hinges to the adjacent torsion bar 1, the arm links 3 and 4, or the torsion links 5 and 6. The arm link hinges 11 and 12 and the torsion link hinges 13 and 14 may be configured to change an angle between the torsion bar 1, the torsion links 5 and 6, and the arm links 3 and 4. In addition, the arm link hinges 11 and 12 and the torsion link hinges 13 and 14 may also transmit a torque or lifting force to the torsion bar 1 via the torsion links 5 and 6 and the arm links 3 and 4. Accordingly, hinges such as the arm link hinges 11 and 12 and the torsion link hinges 13 and 14 may be configured wide from the axes of the hinges. The 4-section link stabilizer 2 configured as described above may change the distance between the ball joints 15 and 16 and the torsion bar 1 through bending of the respective links 3, 4, 5, 6, 7 and 8.

Meanwhile, FIG. 1 illustrates that the 4-section link stabilizer 2 is mounted on the strut assemblies 17 and 18, but the present disclosure is not limited thereto, and may also be connected to various parts (e.g., steering knuckles) of the suspension device in various manners to be used. In addition, FIG. 1 illustrates that the drive links 7 and 8 are coupled to the strut assemblies 17 and 18 in the center side of the car, but the present disclosure is not limited thereto, and may be coupled thereto in the side of the wheel.

Figure 2C:
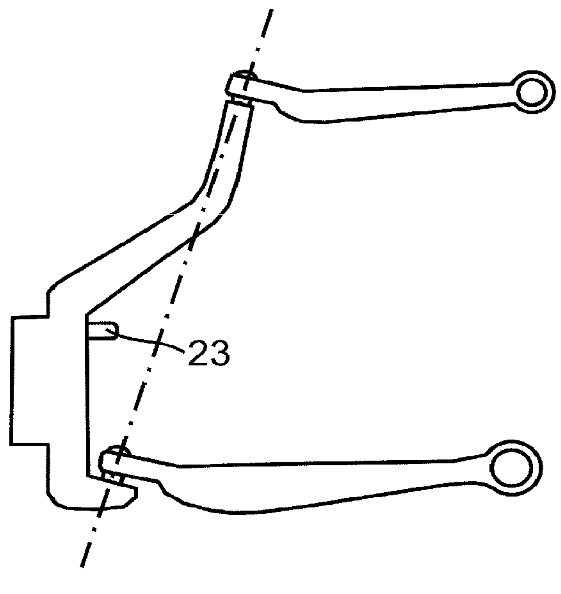

FIGS. 2A to 2C are views illustrating examples in which the drive links 7 and 8 of FIG. 1 are connected to various types of steering knuckles. The alternate long and short dash line illustrated in FIGS. 2A to 2C represents a centerline of a kingpin installed on the steering knuckle. In this case, drive links 21 and 22 may be installed in the center side of the wheel with respect to the kingpin centerline, but the present disclosure is not limited thereto, and a drive link 23 may be installed in the side of the car body with respect to the kingpin centerline. As illustrated, the drive links 21, 22, and 23 may be connected to various types of steering knuckles.

Referring again to FIG. 1, the drive links 7 and 8 may be connected to the strut assemblies 17 and 18, but the present disclosure is not limited thereto. As illustrated in FIGS. 2A-2C, the drive links 7 and 8 may be connected to various types of steering knuckles, and the like, to transmit the torsion of the stabilizer bar to the car body. In the configuration illustrated in FIGS. 2A-2C, the drive links 7 and 8 may be connected to the steering knuckles, where they may be rotated along the kingpin centerlines. Each of the arm links 3 and 4 may be configured to be symmetrical about the torsion bar 1 in the absence of external force. In contrast, upon application of an external force, the arm links 3 and 4 may be configured to be moved forward or backward of the car. The ball joints 15 and 16 may be connected to the arm links 3 and 4 and the drive links 7 and 8, respectively and rotated about the strut assemblies 17 and 18 along the drive links 7 and 8.

Figure 3A:
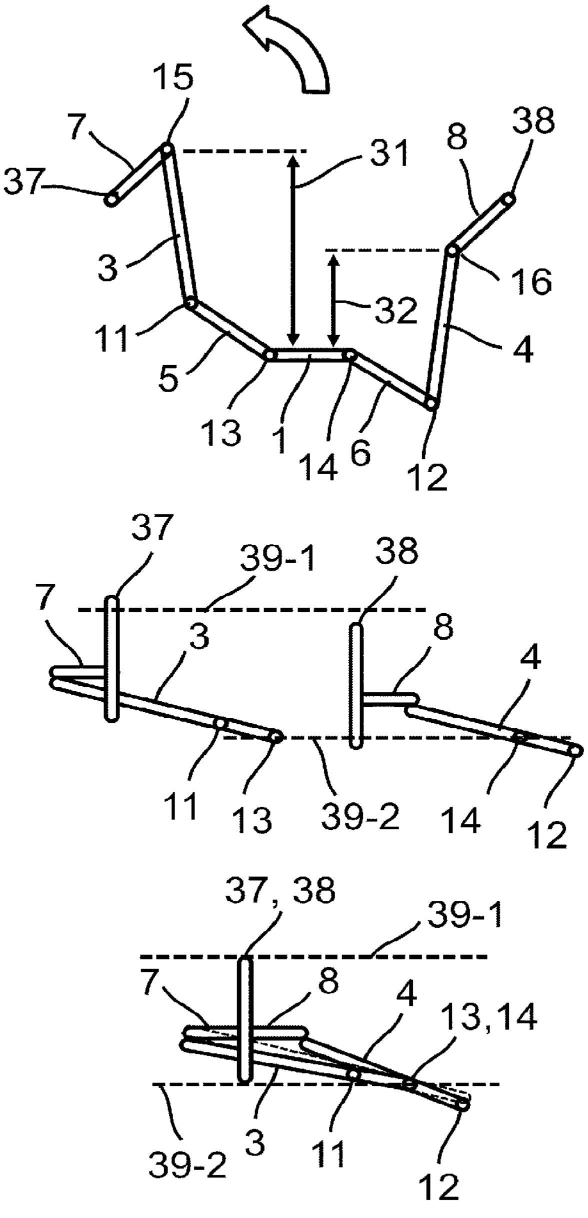
FIGS. 3A to 3C are exemplary views illustrating a movement of the 4-section link stabilizer of FIG. 1 according to a straight-driving or cornering direction of the car.
Figure 3B:
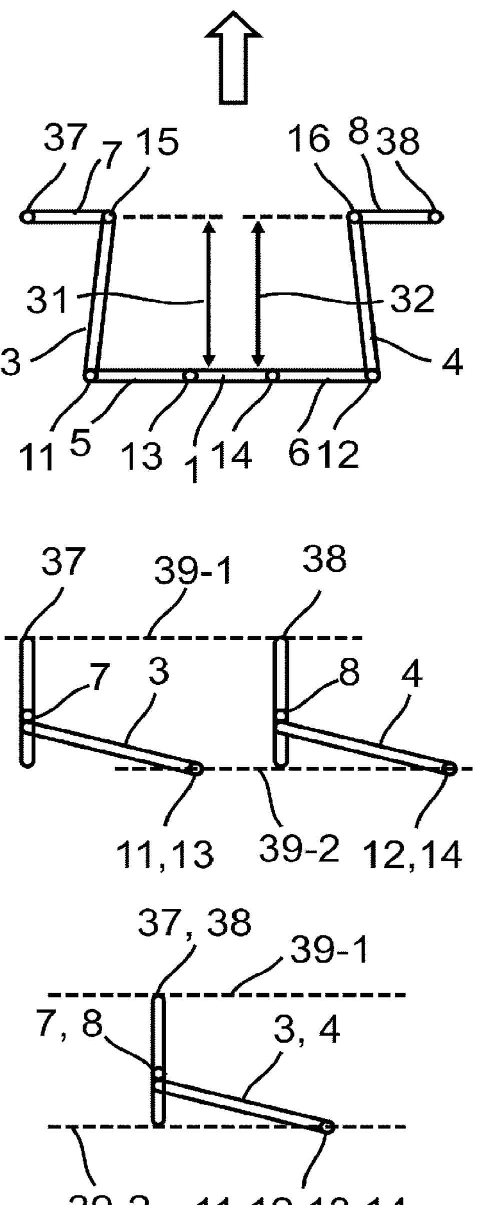
Figure 3C:
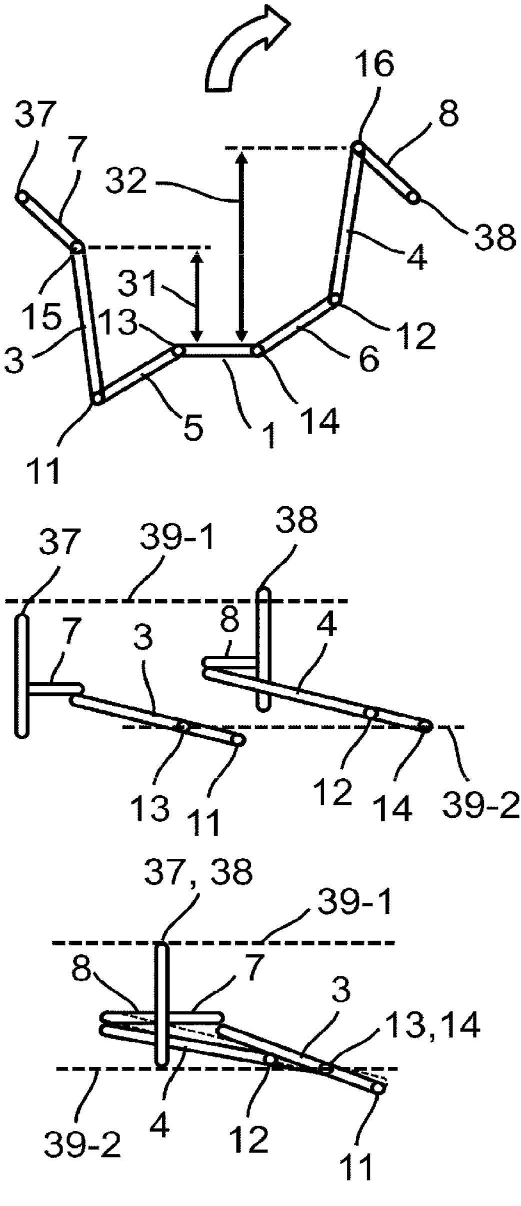

When a plane including a circle drawn by the ball joints 15 and 16 and a plane on which the arm links 3 and 4 are moved are identically coincided with each other in the same plane, a movement of the arm links 3 and 4 may cause the distance between the ball joints 15 and 16 and the torsion bar 1 to be varied, but the height of the strut assemblies 17 and 18 may not be varied. However, when the two planes are not the same plane, that is, when these planes intersect each other, somewhat complicated movement may appear. That is, the ball joints 15 and 16 and the arm links 3 and 4 may be connected to the drive links 7 and 8 and may be moved according to the positions of the strut assemblies 17 and 18. For example, as long as the car does not go over an obstacle, each of the strut assemblies 17 and 18 connected to the left and right wheels may be positioned at the same height, and in this case, as the arm links 3 and 4 are moved, the distance between the ball joints 15 and 16 and the torsion bar 1 may vary. As another example, when one of the left and right wheels of the car goes over the obstacle, the strut assemblies 17 and 18 are positioned at heights different from each other, and accordingly, the heights, angles, directions, and the like of the ball joints 15 and 16 and the arm links 3 and 4 may be different from each other. FIGS. 3A to 3C are exemplary views illustrating a movement of the 4-section link stabilizer of FIG. 1 according to a straight-driving or cornering direction of the car. Referring to FIGS. 1 and 2, the kingpin centerlines 37 and 38 may represent central axes of rotation for the strut assemblies 17 and 18 or the steering knuckles. As illustrated, FIG. 3A may illustrate a state during left-cornering of the car, FIG. 3B may illustrate a state during straight-driving, and FIG. 3C may illustrate a state during right-cornering. The first rows of FIGS. 3A to 3C illustrate the movement of the respective links 3, 4, 5, 6, 7 and 8 on a plan view of the stabilizer. The second rows of FIGS. 3A to 3C illustrate a side view illustrating the stabilizer 2 when viewed from the left side of the strut assembly 17. This can show the changes in heights of the kingpin centerlines 37 and 38 as the respective arm links 3 and 4 are moved, when the strut assembly 17 and 18 and kingpin centerlines 37 and 38 are freely movable up and down, without consideration of the load, centrifugal force or springs of wheels applied to the car body. The third rows of FIGS. 3A to 3C illustrate the kingpin centerlines 37 and 38 superimposed on each other based on the assumption that the kingpin centerlines 37 and 38 are positioned at the same height. By illustrating the respective kingpin centerlines 37 and 38 superimposed on each other, it is possible to compare the relative movements of the links 3, 4, 5, 6, 7 and 8 connected to the kingpin centerlines 37 and 38, respectively.

The dotted lines illustrated in the first rows of FIGS. 3A and 3C represent a virtual line indicating the distances 31 and 32 from the ball joints 15 and 16 to the torsion bar 1.

As illustrated in the first row of FIG. 3B, during straight-driving of the car, a distance 31 from the left ball joint 15 to the torsion bar 1 and a distance 32 from the right ball joint 16 to the torsion bar 1 may be the same as each other. On the other hand, as illustrated in the first rows of FIGS. 3A and 3C, during right-cornering or left-cornering of the car, the distances 31 and 32 from the respective ball joints 15 and 16 to the torsion bar 1 may be different from each other. The distances 31 and 32 to the torsion bar 1 may be longer for the ball joint in the inside wheel direction than the ball joint in the outside wheel direction based on the center of a turn during right-cornering or left-cornering. In this case, the torque may be expressed as $\tau=r\times F$ (where, the distance may be r, and the force may be F). Thus, the force F may be inversely proportional to r when the torque remains the same. That is, even when the torques applied to both ends of the torsion bar 1 is the same as each other, since the distances 31 and 32 are different from each other, the force acting on each of the ball joints 15 and 16 may vary. That is, during left-cornering of the car, a strong force may be applied to the right wheel of the car, thereby increasing the strength of the right wheel spring as a whole. Conversely, during right-cornering of the car, a strong force may be applied to the left wheel of the car, thereby increasing the strength of the left wheel spring as a whole. The strength of the outside wheel spring based on the center of the turn may be greater than that of the inside wheel spring during right-cornering or left-cornering, and the strength of the inside wheel spring and the outside wheel spring may be the same as each other during straight-driving of the car.

The second rows of FIGS. 3A to 3C illustrate the state of the stabilizer without considering the application of the load, centrifugal force or springs of wheels of the car, and in this state, the torsion bar 1 may be positioned at a lower height than a position at which the ball joints 15 and 16 are rotated. As illustrated, the position of rotation of the ball joints 15 and 16 may be the positions at which the drive links 7 and 8 are connected. As an example, the ball joints 15 and 16 may be movable to upper or lower portion of the car while rotating, and the arm links 3 and 4 may be configured to be connected to the ball joints 15 and 16 that is higher and to the torsion bar 1 that is lower and accordingly inclined.

In an embodiment, during left-cornering of the car, when the left wheel is rotated by a certain angle in the counterclockwise direction, the left drive link 7 fixedly connected to the left kingpin centerline 37 may be rotated by a certain angle in the counterclockwise direction in accordance with the movement of the left kingpin centerline 37. As the left drive link 7 is rotated in the counterclockwise direction, the left ball joint 15 is rotated, and the left arm link 3 and the left torsion link 5 connected to the left ball joint 15 may be moved forward of the car. As the left arm link 3 and the left torsion link 5 are moved forward of the car, the distance 31 between the torsion bar 1 and the left ball joint 15 may increase. Conversely, during left-cornering of the car, when the right wheel is rotated by a certain angle in the counterclockwise direction, the right drive link 8 fixedly connected to the right kingpin centerline 38 may be rotated by a certain angle in the counterclockwise direction in accordance with the movement of the right kingpin centerline 38. When the right drive link 8 is rotated in the counterclockwise direction, as the right arm link 4 and the right torsion link 6 connected with the right ball joint 16 are moved backward of the car, the distance 32 between the torsion bar 1 and the right ball joint 16 may decrease. At this time, the right torsion link 6 may be moved more backward of the car than the torsion bar 1 fixed to the car body.

In another embodiment, during right-cornering of the car, when both wheels are rotated by a certain angle in the clockwise direction due to the right-cornering, the drive links 7 and 8 fixedly connected to each of the kingpin centerlines 37 and 38 may be rotated by a certain angle in the clockwise direction according to the movement of the kingpin centerlines 37 and 38. At this time, the left drive link 7 is rotated backward of the car, and the right drive link 8 may be moved forward of the car. As the left drive link 7 is moved backward of the car, the left arm link 3 and the left torsion link 5 are moved backward of the car with respect to the torsion bar 1 fixed to the car body, which may result in a decrease in the distance 31 between the torsion bar 1 and the left ball joint 15. Conversely, as the right drive link 8 are moved forward of the car, the right arm link 4 and the right torsion link 6 may be moved forward of the car with respect to the torsion bar 1 fixed to the car body. Accordingly, the distance 32 between the torsion bar 1 and the right ball joint 16 may be longer than the distance 31 on the left side.

In still another embodiment, during straight-driving of the car, as the respective wheels are positioned parallel to each other toward the front of the car, the left ball joint 15 and the right ball joint 16 may be positioned parallel to each other. In this case, the distances 31 and 32 of the respective ball joints 15 and 16 and the torsion bar 1 may be the same as each other.

As illustrated in the second row of FIG. 3A, upon left-cornering of the car, the distance 31 from the left ball joint 15 to the torsion bar 1 is longer than the distance of from the right ball joint 16 to the torsion bar 1, and accordingly, the height of the left kingpin centerline 37 may be higher than the height of the right kingpin centerline 38. As illustrated in the second row of FIG. 3B, upon straight-driving of the car, the distance 31 from the left ball joint 15 to the torsion bar 1 and the distance 32 from the right ball joint 16 to the torsion bar 1 may be the same as each other, and the heights of the kingpin centerlines 37 and 38 may be the same as each other. In addition, as illustrated in the second rows of FIG. 3C, upon right-cornering of the car, the distance 32 from the right ball joint 16 to the torsion bar 1 is longer than the distance 31 from the left ball joint 15 to the torsion bar 1, and accordingly, the height of the right kingpin centerline 38 may be higher than the height of the left kingpin centerline 37.

The third rows of FIGS. 3A to 3C illustrate the movements of the torsion bar 1 and the respective torsion links 5 and 6 when the heights of the two kingpin centerlines 37 and 38 are the same as each other by the application of the load, centrifugal force or springs of wheels of the car. In the second rows of FIGS. 3A to 3C, the respective arm links 3 and 4 are illustrated as remaining parallel, but the respective arm links 3 and 4 may not maintain the parallel state when the heights of the two kingpin centerlines 37 and 38 become same by the application of the load, centrifugal force or springs of wheels of the car, as illustrated in the third rows of FIGS. 3A and 3C. Accordingly, the torsion bar 1 and the torsion links 5 and 6 may be twisted. The dotted lines illustrated between the two arm links 3 and 4 in the third rows of FIGS. 3A and 3C represent the locations of the components before each of the arm links 3 and 4 is twisted, which overlaps in parallel to each other. On the other hand, the left and right arm links 3 and 4 are not arranged in parallel to each other as illustrated in solid lines. The dotted lines 39-1 and 39-2 illustrated in the second and third rows of FIGS. 3A and 3C are auxiliary lines arranged at the same locations of the dotted lines illustrated in the second and third rows of FIG. 3B, which indicate the locations of the upper and lower ends of the kingpin centerlines 37 and 38 during straight driving of the car, and also illustrates that the distance from the left ball joint 16 to the torsion bar 1 is same as the distance from the right ball joint 15 to the torsion bar 1. The second and third rows of FIGS. 3A and 3C show the comparison of the movements and changes in locations of the kingpins 37 and 38.

Further, as illustrated in the third row of FIG. 3B, in the absence of torsion with respect to the arm links 3 and 4, torque may not be generated in the torsion bar 1 and the torsion links 5 and 6. On the other hand, when torsion occurs with respect to the arm links 3 and 4, torque may be generated in the torsion bar 1 and the torsion links 5 and 6. As illustrated in FIG. 3A, one arm link 3 in the state of being twisted in the downward direction of the car may generate an upward force. At this time, as the distance 31 between the ball joint 15 and the torsion bar 1 increases, the influence of the force from the torque of the torsion bar 1 may decrease. Conversely, the other arm link 4 in the twisted state at the underside of the car may generate a downward force. At this time, since the distance 32 between the ball joint 16 and the torsion bar 1 decreases, the influence of the force from the torque of the torsion bar 1 may increase. Accordingly, the left wheel may be subjected to a force that makes it closer to the car body and the right wheel may be subjected to a force that makes it away from the car body, and in this case, the influence of the force may be greater on the right wheel than on the left wheel. The fact that the wheels of the car are close to the car body may mean that the car body is close to the road floor, whereas the fact that the wheels of the car are away from the car body may mean that the car body is away from the road floor. The torque generated by the torsion bar 1 and the torsion links 5 and 6 may cause the car to tilt to the left. Accordingly, by offsetting the tilting of the car to the right due to the centrifugal force received during left-cornering of the car, the tilt may be alleviated, or rather the car may be made to tilt to the left.

As illustrated in the third row of FIG. 3C, during right-cornering of the car, contrary to the case of left-cornering, by the torque generated from the torsion bar 1 and the torsion links 5 and 6, the right wheel may be subjected to a force that makes it closer the car body, and the left wheel may be subjected to a force that makes it away from the car body. At this time, the force applied to the left wheel may be greater than or equal to the force applied to the right wheel, which may offset the tilt of the car to the left due to the centrifugal force received during right-cornering of the car, thereby alleviating the tilt of the car or rather making the car tilt to the right.

When the car is right-cornering or left-cornering, from the torque generated by the torsion bar 1 and the torsion links 5 and 6, the inside wheel of the turn of the car (e.g., the wheel on the inside of the center of the turn) may be subjected to a force to make it closer to the car body, and the outside wheel (e.g., wheel on the outside side of the center of the turn) may be subjected to a force to make it away from the car body. At this time, the force applied to the outside wheel may be greater than or equal to the force applied to the inside wheel, which may reduce the outward tilt due to rotation or rather make the car tilt to the inner side when the car is right-cornering or left-cornering.

Figure 4A:
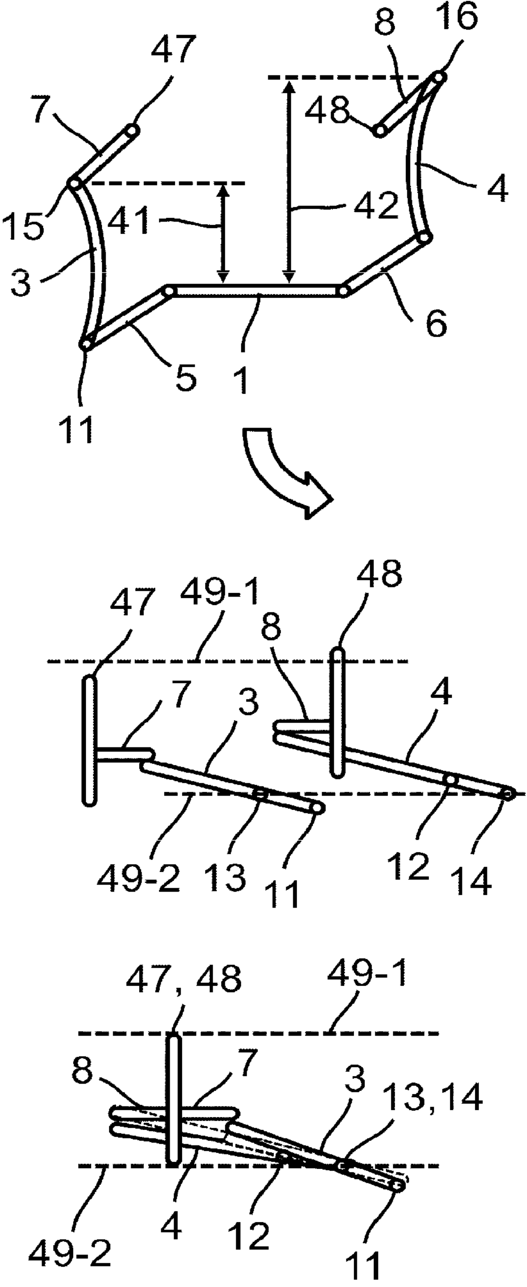
FIGS. 4A to 4C are exemplary views illustrating the movement of the 4-section link stabilizer when the drive links of FIG. 1 are connected to the direction of the wheels of the strut assemblies.
Figure 4B:
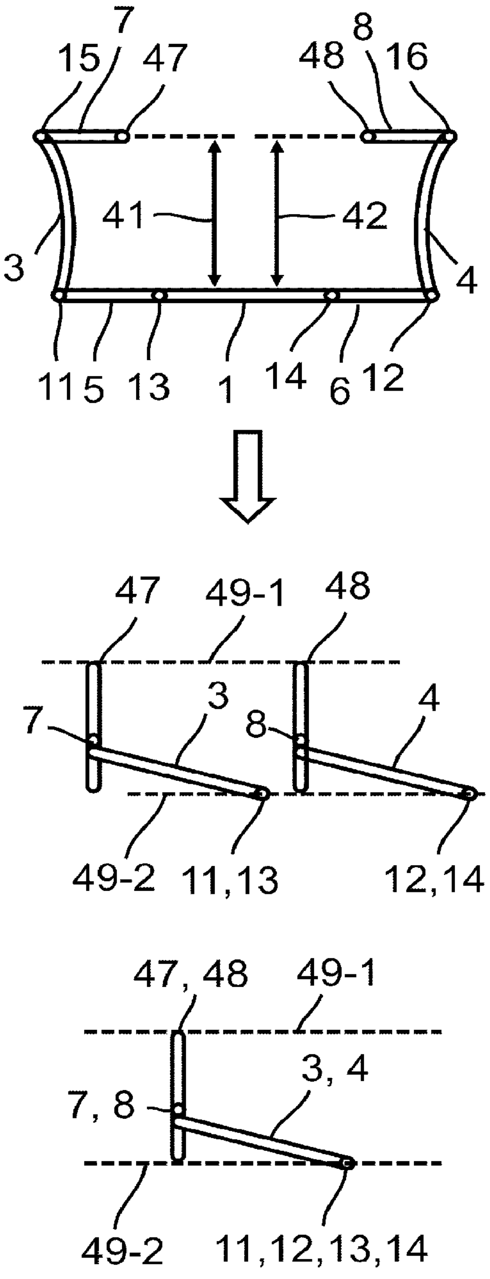
Figure 4C:
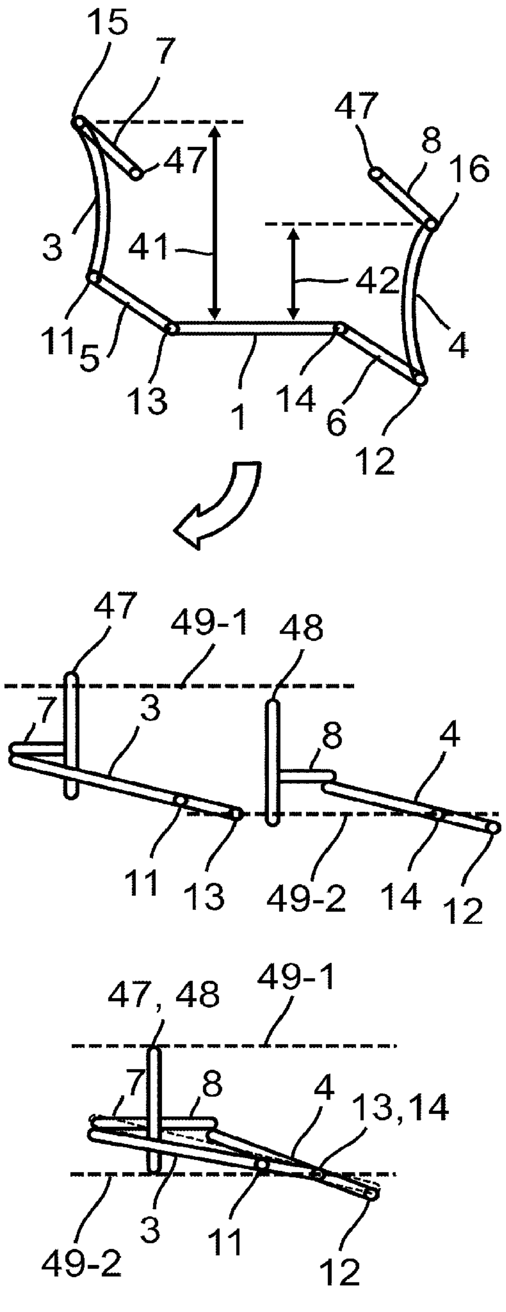

FIGS. 4A to 4C are exemplary views illustrating the movement of the 4-section link stabilizer when the drive links 7 and 8 of FIG. 1 are connected to the side of the wheels of the strut assemblies 17 and 18. As illustrated, the strut assemblies 17 and 18 illustrated in FIGS. 1 to 2C are positioned on the kingpin centerlines 47 and 48, but the present disclosure is not limited thereto, and the 4-section link stabilizer according to the present embodiment may be used in connection with various devices including a steering knuckle. FIG. 4A may illustrate a state of the traveling direction of the car during left-cornering, FIG. 4B may illustrate a state during straight-driving, and FIG. 4C may illustrate a state during right-cornering. In addition, the traveling direction of the car in FIGS. 4A to 4C is illustrated opposite to the traveling direction of the car in FIGS. 3A to 3C, but this may not mean that the car is driving backwards. In addition, the torsion bar 1 may be installed in at least one of the front or rear positions of the car based on the two wheels of the car. For example, tires may be positioned on outside surfaces of the respective arm links 3 and 4, and the torsion bar 1 may be fixed to a front fixing part of the car body. As an example, FIGS. 3A to 3C illustrate a state in which the torsion bar 1 is positioned in back of two wheels with respect to the traveling direction of the car, and the kingpin centerlines 37 and 38 are positioned more forward than the torsion bar 1. On the other hand, FIGS. 4A to 4C illustrate a state in which the torsion bar 1 is positioned in front of two wheels with respect to the traveling direction of the car, and the kingpin centerlines 47 and 48 are positioned more backward than the torsion bar 1.

The first rows of FIGS. 4A to 4C are plan views illustrating the stabilizer, and may illustrate the configuration of the stabilizer when viewed from the top to bottom sides of a car. The first rows of FIGS. 4A to 4C illustrate the movements of the respective links 3, 4, 5, 6, 7 and 8 in plan views illustrating the stabilizer. The second rows of FIGS. 4A to 4C illustrates the configuration of the 4-section link stabilizer 2 when viewed from the side with reference to the one strut assembly 17. That is, the second rows of FIGS. 4A to 4C represent the changes in the heights of the kingpin centerlines 47 and 48 when the respective arm links 3 and 4 are moved, when the strut assemblies 17 and 18 the kingpin centerlines 47 and 48 are freely movable up and down without considering the load, centrifugal force or springs of wheels applied to the car body. The third rows of FIGS. 4A to 4C illustrate the comparison of the movements of the respective connected links 3, 4, 5, 6, 7, and 8 when viewed from the side of the stabilizer 2 with respect to one strut assembly 17, based on the assumption that the kingpin centerlines 47 and 48 are positioned at the same height.

The dotted lines illustrated in the first rows of FIGS. 4A and 4C are virtual lines indicating the distances 41 and 42 from the ball joints 15 and 16 to the stabilizer torsion bar 1 in the plan view.

As illustrated in the first rows of FIGS. 4A to 4C, a distance 42 from the left ball joint 16 of the car to the torsion bar 1 and a distance 41 from the right ball joint 15 of the car to the torsion bar 1 remain the same during straight-driving of the car. However, the corresponding distances 42 and 41 may be different from each other during left-cornering and right-cornering of the car. For example, during left-cornering of the car, the distance 42 from the left ball joint 16 of the car to the torsion bar 1 may be longer than the distance 41 from the right ball joint 15 of the car to the torsion bar 1. In addition, during right-cornering of the car, the distance 42 from the left ball joint 16 of the car to the torsion bar 1 may be shorter than the distance 41 from the right ball joint 15 of the car to the torsion bar 1. Accordingly, the distance from the ball joint of the inside wheel of the rotation center of the car to the torsion bar 1 may be longer than the distance from the ball joint of the outside wheel to the torsion bar 1. That is, during left-cornering of the car, a strong force may be applied on the right wheel to increase the strength of the right wheel spring, and during right-cornering of the car, a strong force may be applied on the left wheel to increase the strength of the left wheel spring. As described above, during cornering of the car, the strength of the outside wheel spring may increase than that of the inside wheel spring of the turn, and during straight-driving of the car, the strengths of the inside wheel spring and the outside wheel spring may be the same as each other. In an embodiment, in the second row of FIG. 4B, during straight-driving of the car, since the distance 42 from the left ball joint 16 to the torsion bar 1 and the distance 41 from the right ball joint 15 to the torsion bar 1 are the same as each other, the heights of the respective kingpin centerlines 47 and 48 may be the same as each other.

As illustrated in the second rows of FIGS. 4A to 4C, when the load, centrifugal force or springs of wheels of the car is not considered, the torsion bar 1 may be positioned lower than the heights of the positions at which the ball joints 15 and 16 are rotated. As illustrated, the position of rotation of the ball joints 15 and 16 may be the positions at which the drive links 7 and 8 are connected. As an example, the ball joints 15 and 16 may be movable upward or downward while rotating, and the arm links 3 and 4 may be configured to be connected to the ball joints 15 and 16 that is higher and to the torsion bar 1 that is lower and accordingly inclined.

The third rows of FIGS. 4A to 4C are views illustrating the movement of the torsion bar 1 and the respective torsion links 5 and 6 when the heights of the two kingpin centerlines 47 and 48 are the same as each other in a state where the load, centrifugal force or springs of wheels of the car is applied. Referring to the second rows of FIGS. 4A to 4C, the respective arm links 3 and 4 remain parallel to each other, but the respective arm links 3 and 4 may not remain parallel to each other when the heights of the two kingpin centerlines 47 and 48 become same by the application of the load, centrifugal force or springs of wheels in the car, as illustrated in the third rows of FIGS. 4A and 4C. Accordingly, the torsion bar 1 and the torsion links 5 and 6 may be twisted.

The dotted lines illustrated between the two arm links 3 and 4 in the third rows of FIGS. 4A and 4C represent the locations of the components before each of the arm links 3 and 4 is twisted, which overlaps in parallel to each other. On the other hand, the left and right arm links 3 and 4 are not arranged in parallel to each other as illustrated in solid lines. The dotted lines 49-1 and 49-2 illustrated in the second and third rows of FIGS. 4A and 4C are auxiliary lines arranged at the same locations of the dotted lines illustrated in the second and third rows of FIG. 4B, which indicate the locations of the upper and lower ends of the kingpin centerlines 47 and 48 during straight driving of the car, and also illustrates that the distance from the left ball joint 16 to the torsion bar 1 is same as the distance from the right ball joint 15 to the torsion bar 1. The second and third rows of FIGS.

4A and 4C show the comparison of the movements and changes in locations of the kingpins 47 and 48.

Further, as illustrated in FIG. 4B, in the absence of torsion with respect to the respective arm links 3 and 4, torque may not be generated in the torsion bar 1 and the torsion links 5 and 6. On the other hand, when torsion occurs with respect to the respective arm links 3 and 4, the torsion bar 1 and the torsion links 5 and 6 may generate torque. The left arm link 4 in FIG. 4A is twisted in the downward direction of the car body to generate an upward force. In this case, as the distance 42 between the ball joint 16 and the torsion bar 1 increases, the influence of the force by the torque of the torsion bar 1 may decrease. Conversely, the right arm link 3 is twisted at the underside of the car, generating a downward force. In this case, since the distance 41 between the ball joint 15 and the torsion bar 1 decreases, the influence of the force from the torque of the torsion bar 1 may increase. Accordingly, the left wheel may be subjected to a force that makes it closer to the car body, and the right wheel may be subjected to a force that makes it away from the car body, and the influence of the force may be greater on the right wheel than on the left wheel. The fact that the wheels of the car are close to the car body may mean that the car body is close to the road floor, and the fact that the wheels of the car are away from the car body may mean that the car body is away from the road floor. The torque generated by the torsion bar 1 and the torsion links 5 and 6 may cause the car to tilt to the left. Accordingly, by offsetting the tilting of the car to the right due to the centrifugal force received during left-cornering of the car, the tilt may be alleviated, or rather the car may be made to tilt to the left.

As illustrated in third row of FIG. 4C, during right-cornering of the car, contrary to the case of left-cornering, by the torque generated from the torsion bar 1 and the torsion links 5 and 6, the right wheel may be subjected to a force that makes it closer to the car body, and the left wheel may be subjected to the force that makes it away from the car body. At this time, the force applied to the left wheel may be greater than or equal to the force applied to the right wheel, which may offset the tilt of the car to the left due to the centrifugal force received during right-cornering of the car, thereby reducing the tilt of the car or rather making the car tilt to the right side.

Figure 5:
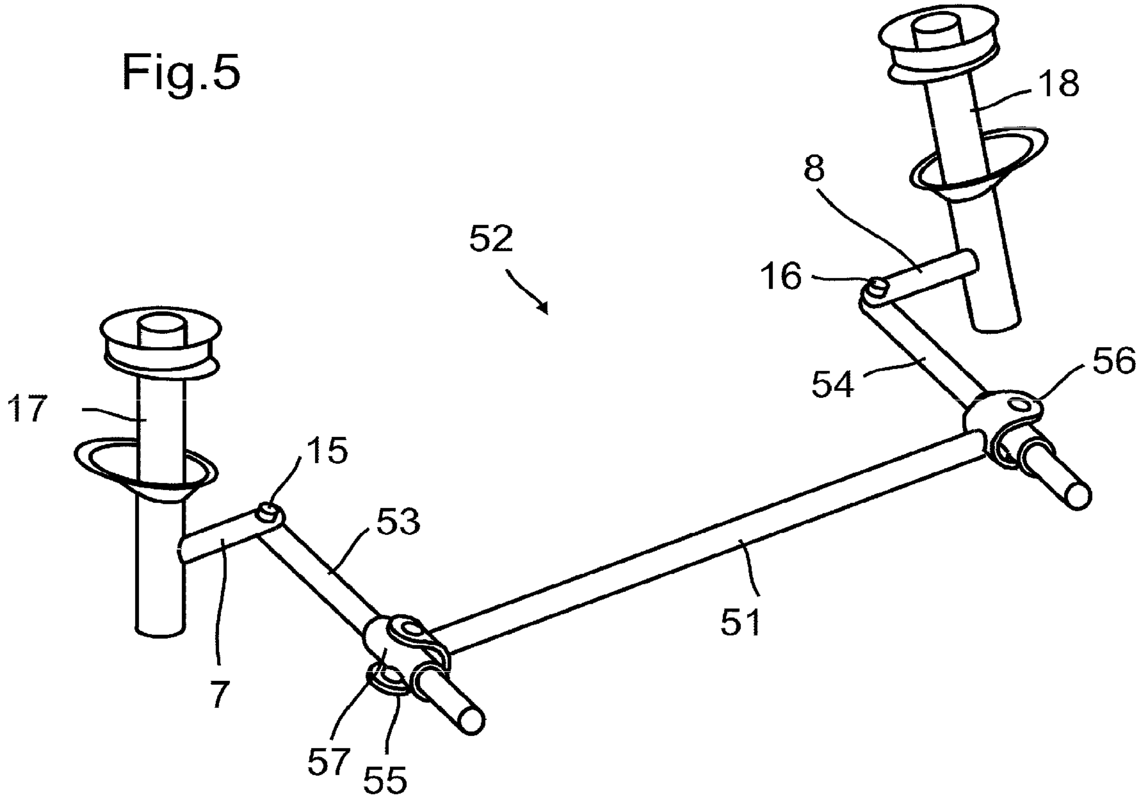
FIG. 5 is a perspective view illustrating a 3-section link stabilizer according to an embodiment of the present disclosure.

During left-cornering or right-cornering of the car, by the torque generated from the torsion bar 1 and the torsion links 5 and 6, the inside wheel of the car during a turn may be subjected to a force that makes it closer to the car body, and the outside wheel may be subjected to a force that makes it away from the car body. At this time, the force applied to the outside wheel may be greater than or equal to the force applied to the inside wheel, which may reduce the outward tilt due to rotation or rather make the car tilt to the inner side when the car is right-cornering or left-cornering. FIG. 5 is a perspective view illustrating a 3-section link stabilizer according to an embodiment of the present disclosure. As illustrated, a 3-section link stabilizer 52 may include a torsion bar 51, arm links 53 and 54, and arm link sliding hinges 55 and 56. The strut assemblies 17 and 18 may include a spring (not illustrated), and the drive links 7 and 8 may be fixedly coupled to the strut assemblies 17 and 18 to be rotated together. One end of each of the two arm links 53 and 54 may be connected to both ends of the torsion bar 51 via the arm link sliding hinges 55 and 56, respectively, and may be moved through the arm link sliding hinges 55 and 56 in a direction orthogonal to the longitudinal direction of the torsion bar 51. The arm links 53 and 54 and drive links 7 and 8 may be connected via the ball joints 15 and 16, and the torsion bar 51 may be fixed to the car body via a fixing device (not shown) and rotated. The arm link sliding hinges 55 and 56 may be configured such that the arm links 53 and 54 are passed therein, and may be configured to be adjustable in length via a sleeve 57. The 3-section link stabilizer 52 may change the length of the respective links 53 and 54 to change the distances between the ball joints 15 and 16 and the torsion bar 1. FIG. 5 illustrates a configuration in which the strut assemblies 17 and 18 are connected to the 3-section link stabilizer 52, but the present disclosure is not limited thereto, and the stabilizer 52 may be connected to the steering knuckle of the suspension device of various types and used. Further, the drive links 7 and 8 may be positioned on the car body side or the wheel side of the kingpin centerline, and the torsion bar 51 may be fixed to the car body via a fixing device.

In an embodiment, referring to FIG. 5, the arm links 53 and 54 may change the effective length for both ends of the torsion bar 51, through a sleeve 57 of the arm link sliding hinges 55 and 56. In FIG. 5, the sleeve 57 of the arm link sliding hinges 55 and 56 in a structure capable of changing the effective length of the arm links 53 and 54 is illustrated as an example, but the present disclosure is not limited thereto. For example, the arm links 53 and 54 may have a structure in which a plurality of pipes are coupled in a slide manner to adjust their length.

Figure 6A:
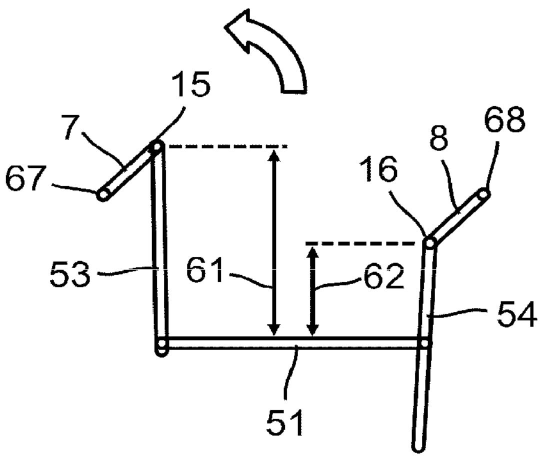
FIGS. 6A to 6C are exemplary views illustrating the movement of the 3-section link stabilizer of FIG. 5 according to the direction of the car during straight-driving or cornering.
Figure 6A:
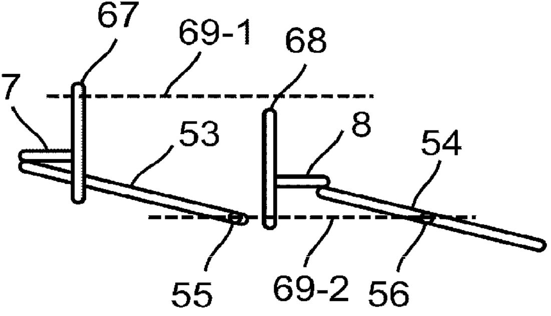
Figure 6A:
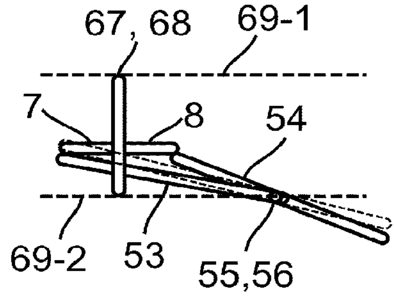
Figure 6B:
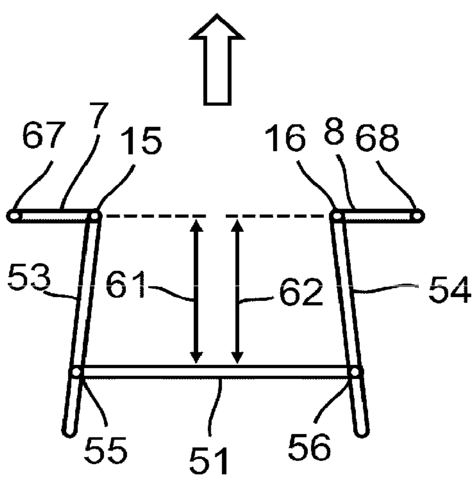
Figure 6B:
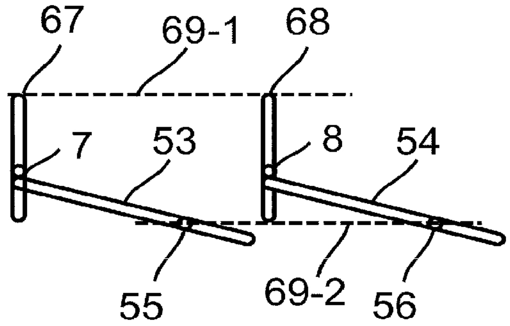
Figure 6B:
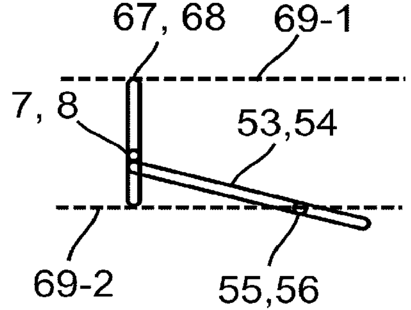
Figure 6C:
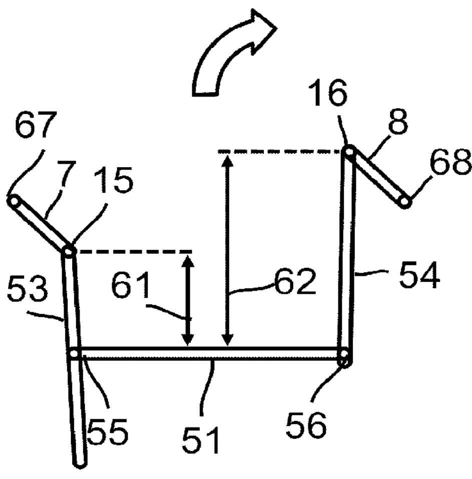
Figure 6C:
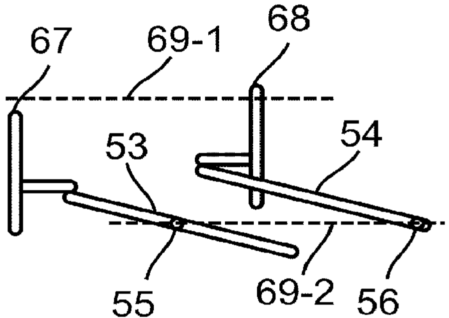
Figure 6C:
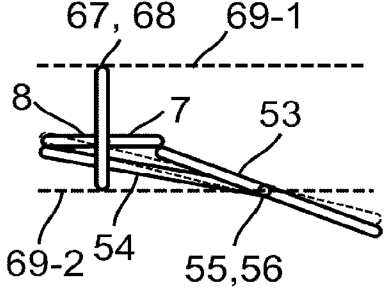

The ball joints 15 and 16 may be configured to enable a three-dimensional rotation, and the arm link sliding hinges 55 and 56 may include the sleeve 57 rotatable about a pin in the center of the hinge. Further, the inside of the sleeve 57 may be configured to allow the arm links 53 and 54 to be slid. Accordingly, in the absence of an external force, the left arm link 53 and the right arm link 54 may be configured to be symmetrical, and the two arm links 53 and 54 may be configured to be moved forward or backward of the car when external force is applied thereto. At this time, the ball joints 15 and 16 may be rotated about the strut assemblies 17 and 18 along the drive links 7 and 8, and may be moved as the positions of the strut assemblies 17 and 18 change. FIGS. 6A to 6C are exemplary views illustrating the movement of the 3-section link stabilizer of FIG. 5 according to the direction of the car during straight-driving or cornering. In the FIGS. 6A to 6C, the kingpin centerlines 67 and 68 may represent the position of the strut assemblies 17 and 18 illustrated in FIG. 5. As illustrated, FIG. 6A may illustrate a state of the traveling direction during left-cornering of the car, FIG. 6B may illustrate a state during straight-driving, and FIG. 6C may illustrate a state during right-cornering. The first rows of FIGS. 6A to 6C illustrate the movement of the respective links 53, 54, 7 and 8 in plan views illustrating the stabilizer. The second rows of FIGS. 6A to 6C illustrate a state of the 3-section link stabilizer 52 as illustrated in FIG. 5, when viewed from the side with respect to the one strut assembly 17. That is, the second rows of FIGS. 6A to 4C represent the changes in the heights of the kingpin centerlines 67 and 68 when the respective arm links 53 and 54 are moved, when the strut assemblies 17 and 18 and the kingpin centerlines 67 and 68 are freely movable up and down without considering the load, centrifugal force or springs of wheels applied to the car body. The third rows of FIGS. 6A to 6C represent the comparison of the movements of the connected links 53, 54, 7 and 8, respectively, based on the assumption that the kingpin centerlines 67 and 68 are positioned at the same height. The second rows of FIGS. 6A to 6C illustrate a state of the 3-section link stabilizer 52 illustrated in FIG. 5, when viewed from the side with respect to the one strut assembly 17. That is, the second rows of FIGS. 6A to 6C represent the changes in heights of the connected kingpin centerlines 67 and 68 respectively, when the respective arm links 53 and 54 are moved, without considering the load, centrifugal force or springs of wheels applied to the car body. The third rows of FIGS. 6A to 6C represent the comparison of the movements of the connected links 53, 54, 7 and 8, respectively, based on the assumption that the kingpin centerlines 67 and 88 are positioned at the same height by the application of the load, centrifugal force or springs of wheels in the car. The dotted lines illustrated between the two arm links 53 and 54 in the third row of FIGS. 6A and 6C represent the positions of the components before the respective arm links 53 and 54 are twisted, which overlaps in parallel to each other, and represent a state in which the left arm link 53 and the right arm link 54 as illustrated in solid lines are non-parallel to each other. In this case, the torsion bar 51 may be twisted.

As illustrated in the first rows of FIGS. 6A to 6C, during straight-driving of the car, a distance 61 from the left ball joint 15 of the car to the torsion bar 51 and a distance 62 from the right ball joint 16 of the car to the torsion bar 51 are the same as each other, but during left-cornering and right-cornering of the car, the distances 61 and 62 may be different from each other. For example, during left-cornering of the car, the distance 61 from the left ball joint 15 of the car to the torsion bar 51 may be longer than the distance 62 from the right ball joint 16 of the car to the torsion bar 51. In addition, during right-cornering of the car, the distance 61 from the left ball joint 15 of the car to the torsion bar 51 may be shorter than the distance 62 from the right ball joint 16 of the car to the torsion bar 51. Accordingly, the distance from the ball joint of the inside wheel of the rotation center of the car to the torsion bar 51 may be longer than the distance from the ball joint of the outside wheel to the torsion bar 51. For the same magnitude of torque, the force and the distance to the position at which the force acts may be inversely proportional to each other. That is, during left-cornering of the car, a strong force may be applied on the right wheel to increase the strength of the right wheel spring, and during right-cornering of the car, a strong force may be applied on the left wheel to increase the strength of the left wheel spring. As described above, during cornering of the car, the strength of the outside wheel spring may increase than that of the inside wheel spring of the turn, and during straight-driving of the car, the strengths of the inside wheel spring and the outside wheel spring may be the same as each other. In an embodiment, as illustrated in the second row of FIG. 6B, during straight-driving of the car, since the distance 61 from the left ball joint 15 of the car to the torsion bar 1 and the distance from the right ball joint 16 of the car to the torsion bar 1 are the same as each other, the heights of the respective kingpin centerlines 47 and 48 may be the same as each other.

The second rows of FIGS. 6A to 6C illustrate the state without taking the load, centrifugal force, or springs of wheels of the car into consideration. The state as illustrated may represent a situation when the torsion bar 1 is positioned lower than the height of the position at which the ball joints 15 and 16 are rotated. As illustrated, the position of rotation of the ball joints 15 and 16 may be the positions at which the drive links 7 and 8 are connected. As an example, the ball joints 15 and 16 may be configured to be movable upward or downward while rotating, and the arm links 53 and 54 may be configured to be connected to the torsion bar 51 at the same location as the ball joints 15 and 16 that are higher and to the arm link sliding hinges 55 and 56 that are lower and accordingly inclined. As illustrated in the second rows of FIG. 6B, during straight-driving of the car, the distance 61 from the left ball joint 15 to the torsion bar 51 and the distance 62 from the right ball joint 16 to the torsion bar 51 may be the same as each other. Accordingly, the heights of the respective kingpin centerlines 67 and 68 may be the same as each other. As illustrated in FIG. 6A, during left-cornering of the car, the distance 61 from the left ball joint 15 to the torsion bar 51 may be longer than the distance 62 from the right ball joint 16 to the torsion bar 51, and accordingly, the height of the left kingpin centerline 67 may be greater than that of the right kingpin centerline 68. As illustrated in FIG. 6C, during right-cornering of the car, the distance 62 from the right ball joint 16 to the torsion bar 51 may be longer than the distance 61 from the left ball joint 15 to the torsion bar 51, and accordingly, the height of the left kingpin centerline 67 may be greater than that of the left kingpin centerline 68.

The third rows of FIGS. 6A to 6C are views illustrating the movement of the torsion bar 51 and the arm links 53 and 54 when the heights of the two kingpin centerlines 67 and 68 match each other upon application of the load, centrifugal force or springs of wheels of the car. Referring to the first and second rows of FIG. 6B, during straight-driving of the car, the distances 61 and 62 may be the same as each other and the respective kingpin centerlines 67 and 68 may be positioned at the same height. As described above, when the respective kingpin centerlines 67 and 68 are maintained at the same position, no torsion may occur and no torque may be generated in the torsion bar 51. On the other hand, when torsion occurs in the torsion bar 51, the torsion bar 51 may generate torque.

Referring to the first and second rows of FIGS. 6A and 6C, while the car is turning left, the left kingpin centerline 67 may be positioned higher than the right kingpin centerline 68, and while the car is turning right, the right kingpin centerline 68 may be positioned higher than the left kingpin centerline 67. Accordingly, the torsion bar 51 may be twisted. Here, the dotted lines 69-1 and 69-2 illustrated in the second and third rows of FIGS. 6A and 6C are auxiliary lines arranged at the same locations of the dotted lines illustrated in the second and third rows of FIG. 6B, which indicate the locations of the upper and lower ends of the kingpin centerlines 67 and 68 during straight driving of the car, which illustrates that the distance 61 from the left ball joint 16 to the torsion bar 51 is same as the distance 62 from the right ball joint 15 to the torsion bar 51. The second and third rows of FIGS. 6A and 6C show the comparison of the movements and changes in locations of the kingpins 67 and 68.

In FIG. 6A, the left arm link 53 is twisted downwards of the car to generate an upward force. In this case, the distance 61 between the ball joint 15 and the torsion bar 51 increases, and the influence of the force by the torque of the torsion bar 51 may be lower. Conversely, in FIG. 6C, the right arm link 54 is twisted at the underside of the car, generating a downward force. In this case, since the distance 62 between the ball joint 16 and the torsion bar 1 decreases, the influence of the force from the torque of the torsion bar 51 may be greater. Accordingly, the left wheel may be subjected to a force that makes it closer to the car body, and the right wheel may be subjected to a force that makes it away from the car body, and the influence of the force from the torque may be greater on the right wheel than on the left wheel. The fact that the wheels of the car are close to the car body may mean that the car body is close to the road floor, and the fact that the wheels of the car are away from the car body may mean that the car body is away from the road floor. Accordingly, the torque generated by the torsion bar 51 may make the car tilt to the left. Accordingly, by offsetting the tilting of the car to the right due to the centrifugal force received during left-cornering of the car, the tilt may be alleviated, or rather the car may be made to tilt to the left.

As shown in the third row of FIG. 6C, during right-cornering of the car, contrary to the case of left-cornering, by the torque generated from the torsion bar 51, the right wheel may be subjected to a force that makes it closer to the car body, and the left wheel may be subjected to a force that makes it away from the car body. At this time, the force applied to the left wheel may be greater than or equal to the force applied to the right wheel, which may offset the tilt of the car to the left due to the centrifugal force received during right-cornering of the car, thereby reducing the tilt of the car.

During left-cornering or right-cornering of the car, by the torque generated from the torsion bar 51, the inside wheel of the turn (e.g., the wheel on the inside of the center of the turn) may be subjected to a force to make it closer to the car body, and the outside wheel (e.g., the wheel on the outside of the center of the turn) may be subjected to a force to make it away from the car body. At this time, the force applied to the outside wheel may be greater than or equal to the force applied to the inside wheel, which may reduce the outward tilt due to rotation or rather making the car tilt to the inner side of the rotation when the car is cornering.

Figure 7A:
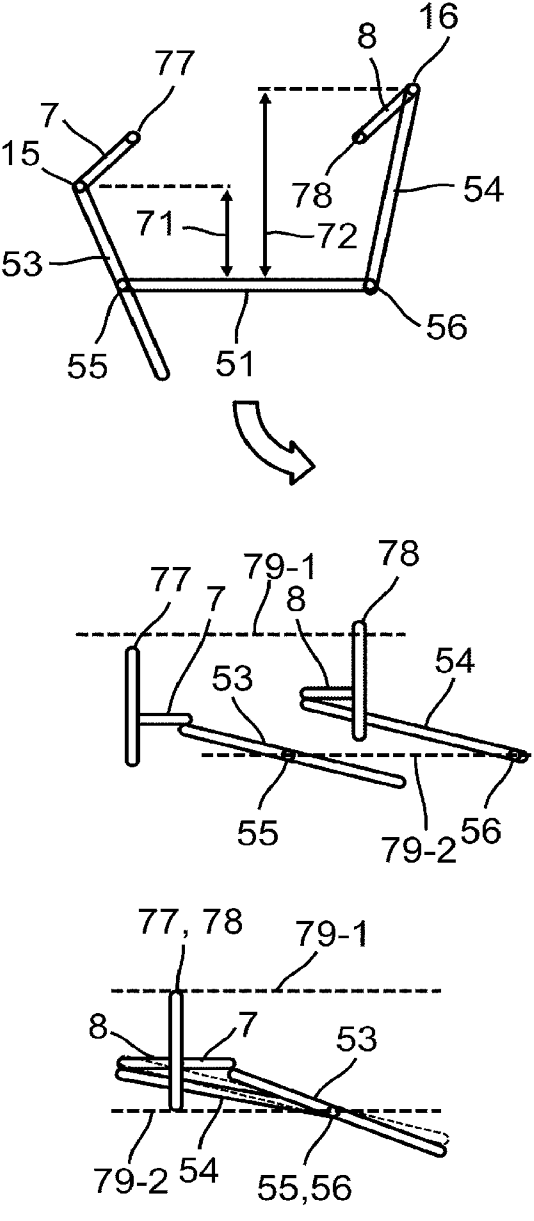
FIGS. 7A to 7C are exemplary views illustrating the movement of the 3-section link stabilizer when the drive links of FIG. 5 are connected to the direction of the wheels of the strut assemblies.
Figure 7B:
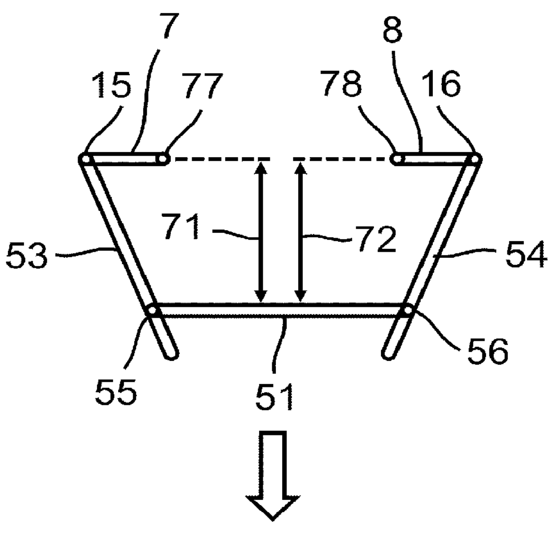
Figure 7B:
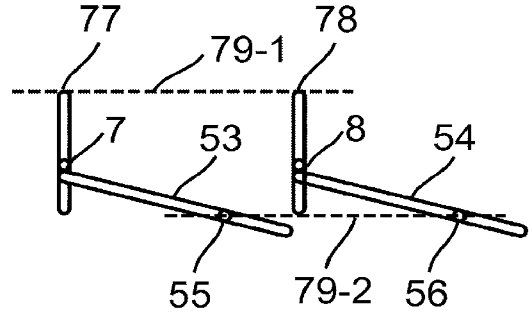
Figure 7B:
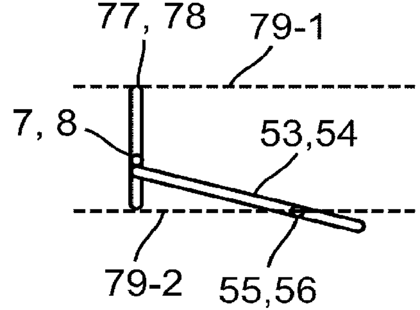
Figure 7C:
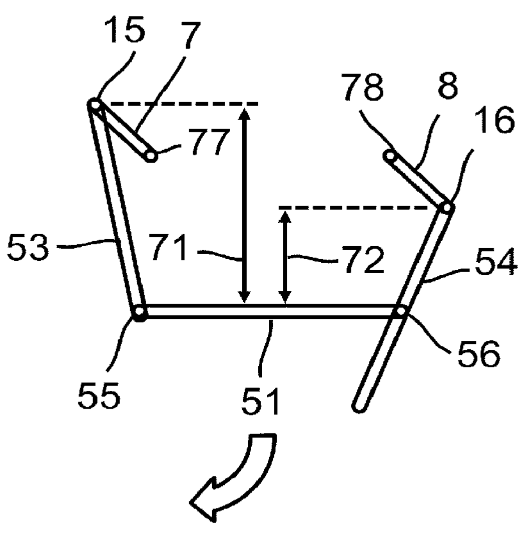
Figure 7C:
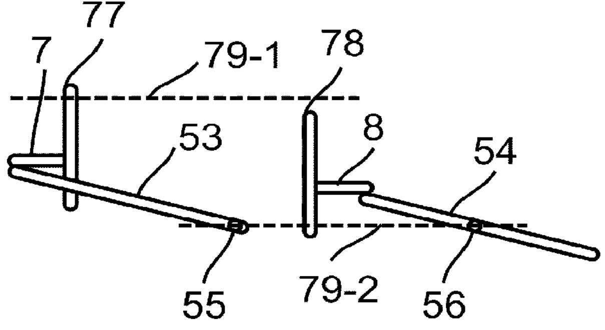
Figure 7C:
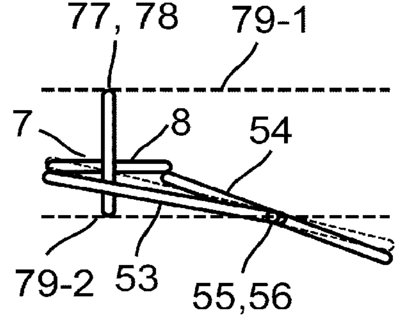

FIGS. 7A to 7C are exemplary views illustrating the movement of the 3-section link stabilizer when the drive links 7 and 8 of FIG. 5 are connected to the side of the wheels of the strut assemblies 17 and 18. The drive links 7 and 8 may be coupled to the car side of the strut assemblies 17 and 18 illustrated in FIG. 5, but the present disclosure is not limited thereto, and may also be coupled to the side of the wheels of the car. FIGS. 7A-7C illustrate a case in which the 3-section link stabilizer 52 is coupled to the vicinity of the wheels of the strut assemblies 17 and 18. In addition, although it may be assumed that the strut assemblies 17 and 18 of FIG. 5 are installed on kingpin centerlines 77 and 78, various devices including steering knuckles may be installed on the kingpin centerlines 77 and 78. FIG. 7A may illustrate a state of the traveling direction of the car during left-cornering, FIG. 7B may illustrate a state during straight-driving, and FIG. 7C may illustrate a state during right-cornering. At this time, although the traveling direction of the car in FIGS. 6A to 6C and the traveling direction of the car in FIGS. 7A to 7C are illustrated to be different from each other, FIGS. 7A to 7C may not mean that the car is driving backwards.

The first rows of FIGS. 7A to 7C are plan views illustrating the stabilizer, in which the configuration of the stabilizer is viewed from the top to bottom sides of the car. The first rows of FIGS. 7A to 7C illustrate the movement of the respective links 53, 54, 7 and 8 in plan views illustrating the stabilizer. The second rows of FIGS. 7A to 7C illustrate a state of the 3-section link stabilizer 52 when viewed from the side with reference to the one strut assembly 17. That is, the second rows of FIGS. 7A to 7C may represent the changes in the heights of the kingpin centerlines 77 and 78 when the respective arm links 53 and 54 are moved, without considering the load, centrifugal force or springs of wheels applied to the car body. The third rows of FIGS. 7A to 7C represent the comparison of the movements of the connected links 53, 54, 7 and 8, respectively, based on the assumption that the kingpin centerlines 77 and 78 are positioned at the same height. The dotted lines 79-1 and 79-2 illustrated in the second and third rows of FIGS. 7A and 7C are auxiliary lines arranged at the same locations of the dotted lines illustrated in the second and third rows of FIG. 7B, which indicate the locations of the upper and lower ends of the kingpin centerlines 77 and 78 during straight driving of the car, and also illustrates that the distance 72 from the left ball joint 16 to the torsion bar 51 is same as the distance 71 from the right ball joint 15 to the torsion bar 51. The second and third rows of FIGS. 7A and 7C show the comparison of the movements and changes in locations of the kingpins 77 and 78.

As illustrated in the first rows of FIGS. 7A to 7C, during straight-driving of the car, a distance 72 from the left ball joint 16 of the car to the torsion bar 51 and a distance 71 from the right ball joint 15 of the car to the torsion bar 51 are the same as each other, but during left-cornering and right-cornering of the car, the distances may be different from each other. For example, during left-cornering of the car, the distance 72 from the left ball joint 16 of the car to the torsion bar 51 may be longer than the distance 71 from the right ball joint 15 of the car to the torsion bar 51. In addition, during right-cornering of the car, the distance 72 from the left ball joint 16 of the car to the torsion bar 51 may be shorter than the distance 71 from the right ball joint 15 of the car to the torsion bar 51. Accordingly, the distance from the ball joint of the inside wheel of the rotation center of the car to the torsion bar 51 may be longer than the distance from the ball joint of the outside wheel to the torsion bar 51. That is, during left-cornering of the car, a strong force may be applied on the right wheel to increase the strength of the right wheel spring, and during right-cornering of the car, a strong force may be applied on the left wheel to increase the strength of the left wheel spring. As described above, during cornering of the car, the strength of the outside wheel spring may increase than that of the inside wheel spring of the turn, and during straight-driving of the car, the strengths of the inside wheel spring and the outside wheel spring may be the same as each other. In addition, the heights of the kingpin centerlines 77 and 78 may vary according to the distances 71 and 72 from the respective ball joints 15 and 16 to the torsion bar 51.

The second rows of FIGS. 7A to 3C illustrate the state of the stabilizer without considering the load, centrifugal force or springs of wheels of the car, in which case the torsion bar 51 may be positioned at a lower height than a position at which the ball joints 15 and 16 are rotated. As illustrated, the position of rotation of the ball joints 15 and 16 may be positions at which the drive links 7 and 8 are connected, and the torsion bar 51 may be connected to the arm link sliding hinges 55 and 56. As an example, the ball joints 15 and 16 may be configured to be movable upward or downward while rotating, and the arm links 53 and 54 may be configured to be connected to the ball joints 15 and 16 that are higher and the torsion bar 1 or the arm link sliding hinges 55 and 56 that are lower and accordingly inclined.

The third rows of FIGS. 7A to 7C illustrate the movement of the torsion bar 51 and the arm links 53 and 54 when the heights of the two kingpin centerlines 77 and 78 match each other upon application of the load, centrifugal force or springs of wheels of the car. Referring to the second rows of FIGS. 7A to 7C, during straight-driving of the car, the respective arm links 53 and 54 remain parallel to each other, but during cornering of the car, the respective arm links 53 and 54 may not remain parallel to each other. Accordingly, the torsion bar 51 may be twisted. The dotted lines 79-1 and 79-2 illustrated in the second and third rows of FIGS. 7A and 4C may represent the positions of the kingpin centerlines 77 and 78 before the arm links 3 and 53 are twisted. In addition, in the absence of torsion with respect to the arm links 53 and 54 of FIG. 7B, torque may not be generated, but when torsion occurs, torque may be generated in the torsion bar 51. In FIG. 7A, the left arm link 54 is twisted downwards of the car body to generate an upward force. In this case, as the distance 72 between the ball joint 16 and the torsion bar 51 increases, the influence of the force by the torque of the torsion bar 51 may be lower. Conversely, since the distance 71 between the ball joint 15 and the torsion bar 51 connected to the right arm link 53 decreases, the influence of the force from the torque of the torsion bar 51 may be greater. Accordingly, the left wheel may be subjected to a force that makes it closer to the car body, and the right wheel may be subjected to a force that makes it away from the car body, and the influence of the force may be greater on the right wheel than on the left wheel. The fact that the wheels of the car are close to the car body may mean that the car body is close to the road floor, and the fact that the wheels of the car are away from the car body may mean that the car body is away from the road floor. The torque generated by the torsion bar 1 may cause the car to tilt to the left. Accordingly, by offsetting the tilting of the car to the right due to the centrifugal force received during left-cornering of the car, the tilt may be alleviated or rather the car may be made to tilt to the left.

As illustrated in the third rows of FIG. 7C, during right-cornering of the car, contrary to the case of left-cornering, by the torque generated from the torsion bar 51, the right wheel may be subjected to a force that makes it closer to the car body, and the left wheel may be subjected to a force that makes it away from the car body. At this time, the force applied to the left wheel may be greater than or equal to the force applied to the right wheel, which may offset the tilt of the car to the left due to the centrifugal force received during right-cornering of the car, thereby reducing the tilt of the car or rather making the car tilt to the right side.

Figure 8:
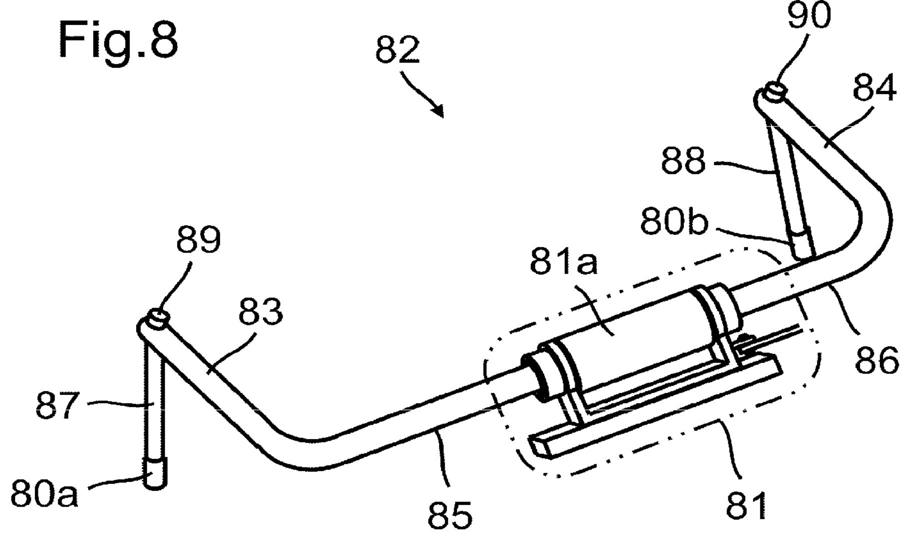
FIG. 8 is a perspective view of a stabilizer configured to include a spline shaft control device in a central portion according to an embodiment.

During left-cornering or right-cornering of the car, by the torque generated from the torsion bar 51, the inside wheel of the car during a turn may be subjected to a force that makes it closer to the car body, and the outside wheel may be subjected to a force that makes it away from the car body. At this time, the force applied to the outside wheel may be greater than or equal to the force applied to the inside wheel, which may reduce the outward tilt due to rotation or making the car tilt to the inner side when the car is right-cornering or left-cornering. FIG. 8 is a perspective view illustrating a stabilizer including a spline shaft control device 81 according to an embodiment. As illustrated, a spline shaft stabilizer 82 may include torsion bar portions 85 and 86 and arm portions 83 and 84 connected to both ends of the spline shaft control device 81. The torsion bar portions 85 and 86 may be fixed to the car body via a fixing device (not illustrated) to be rotatable in place. Further, one ends 89 and 90 of respective links 87 and 88 may be connected to the arm portions 83 and 84, and the other ends 80 *a* and 80 *b* may be connected to suspension arms, strut assemblies, or steering knuckles, although the present disclosure is not limited thereto.

In an embodiment, the spline shaft control device 81 may be fixed to the car body. The torsion bar portions 85 and 86 may include a first torsion bar portion 85 and a second torsion bar portion 86 connected to both ends of the spline shaft control device 81. In this case, a first spline gear may be formed on one end of the first torsion bar portion 85, and a second spline gear may be formed on one end of the second torsion bar portion 86. The two arm portions 83 and 84 may be integrally connected to each of the first and second torsion bar portions 85 and 86, and the two links 87 and 88 may be connected to each of the two arm portions 83 and 84.

In this example, the spline shaft control device 81 may include a control boss (not illustrated) configured so that the first spline gear and the second spline gear are inserted into and engaged within each of one end and the other end. Further, it may be configured such that, as the control boss of the spline shaft control device 81 is moved in the longitudinal direction (or axial direction), additional torsion may be generated between the first and second spline gears.

Figure 9A:
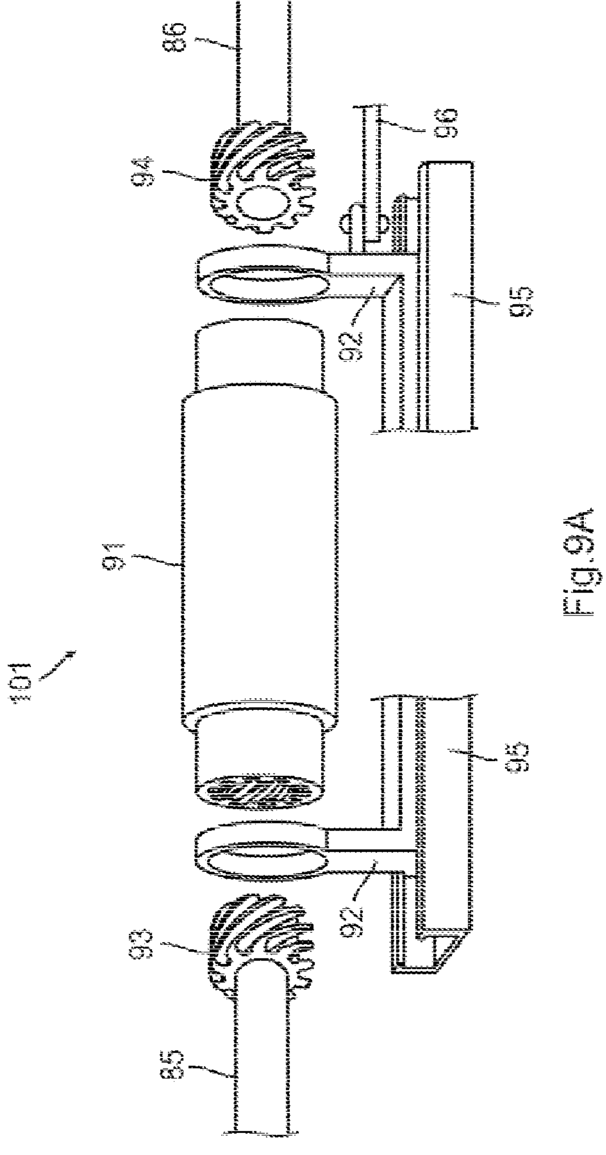
FIG. 9A is an exploded perspective view of the spline shaft control device of FIG. 8.

FIG. 9A is an exploded perspective view of the spline shaft control device 81 of FIG. 8. As illustrated, the spline shaft control device 81 may include a control boss 91, a control boss carrier 92, a control boss carrier rail 95 and a control boss carrier drive rod 96. A helical spline gear 93 may be formed at one end of the first torsion bar portion 85, and a helical spline gear 94 may be formed at one end of the second torsion bar portion 86 which faces the first torsion bar portion 85. In this example, the respective helical spline gears 93 and 94 may be positioned to face each other and may be configured to be engaged within the control boss 91 through openings formed at both ends of the control boss 91. A spline gear may be formed within both ends of the control boss 91 such that the helical spline gears 93 and 94 of the respective torsion bar portions 85 and 86 may be engaged and coupled thereto. The spline shaft control device 81 configured as described above may be moved in the direction of axis of rotation thereof when the control boss 91 is rotated. Although not illustrated, in the spline shaft control device 81, the control boss 91 may be moved to the shaft side by a separate drive device.

Referring back to FIG. 8, the first spline gear 93 and the second spline gear 94 may be formed at one end of each of the two torsion bar portions 85 and 86. The first spline gear 93 may be configured in the form of a helical spline gear, and may be configured to be engaged within one side of the control boss. On the other hand, the second spline gear 94 may also be configured in the form of a helical spline gear, and configured to be, from a direction of facing the first spline gear 93, engaged within the other side of the control boss. In this configuration, during cornering of the car, the two torsion bar portions 85 and 86 are twisted by the first and second spline gears 93 and 94 according to the direction of cornering of the car, and accordingly, the respective torsion bar portions 85 and 86 may be rotated in longitudinal direction differently from each other. Due to the rotation of the two torsion bar portions 85 and 86, the first and second spline gears 93 and 94 are engaged within the control boss 91, respectively, and the inside positions of each of the first and second spline gears 93 and 94 in contact with the control boss 91 may be different from each other. For example, during left-cornering of the car, the control device 81 may be moved to the right with respect to the central portion of the car, based on the traveling direction of the car. When the control device 81 is moved to the right, the second spline gear 94 in engagement may enter into the control boss 91 in an inward direction, and the first spline gear 93 in engagement may exit from the control boss 91 in an outward direction. At this time, the first spline gear 93 in contact with the control boss 91 may come into contact the lower end with respect to the traveling direction of the car forward, and the second spline gear 94 may come into contact with the upper end. Each of the spline gears 93 and 94 may be moved within the control boss while maintaining a predetermined interval.

The control device 81 may be moved in the axial direction via the spline gears of the control boss 91 and the helical spline gears 93 and 94 of the torsion bar portions 85 and 86. A rail-shaped groove may be formed on one surface of the control boss carrier rail 95, and the control boss carrier 92 may be configured to move along the groove of the control boss carrier rail 95. At this time, the control boss 91 may be moved together with the control boss carrier rail 95 in the axial direction by the control boss carrier rail 95. The control boss carrier drive rod 96 may be configured to be connected to a drive device (not illustrated) to move the control boss carrier rail 95 in the axial direction. At this time, the helical spline gears 93 and 94 within the control boss 91 may maintain a predetermined interval. According to the axial movement of the control boss 91, the helical spline gears 93 and 94 may have relatively varying degrees of torsion from each other, and depending on situations, may be twisted in opposite directions to each other. When there is no movement of the control boss 91 in the axial direction, the respective helical spline gears 93 and 94 may be rotated together with the control boss 91 without changing the relative degree of torsion.

In an embodiment, in the inside of both ends of the control boss 91, a helical spline gear may be formed such that the respective helical spline gears 93 and 94 can be engaged with both ends of the control boss 91. The control boss 91 is movable in the axial direction along the control boss carrier rail 95 by the control boss carrier 92, the control boss carrier drive rod 96, and the drive device connected to the control boss carrier drive rod 96. In this case, the control boss carrier rail 95 may be fixed to the car body. Meanwhile, the drive device may include an actuator including a hydraulic device, an actuator including an electric motor and a screw shaft, and the like, but is not limited thereto. For example, instead of using a separate drive device, the control boss carrier drive rod 96 may be interlocked with one of several steering devices of the car to be driven.

Figure 9B:
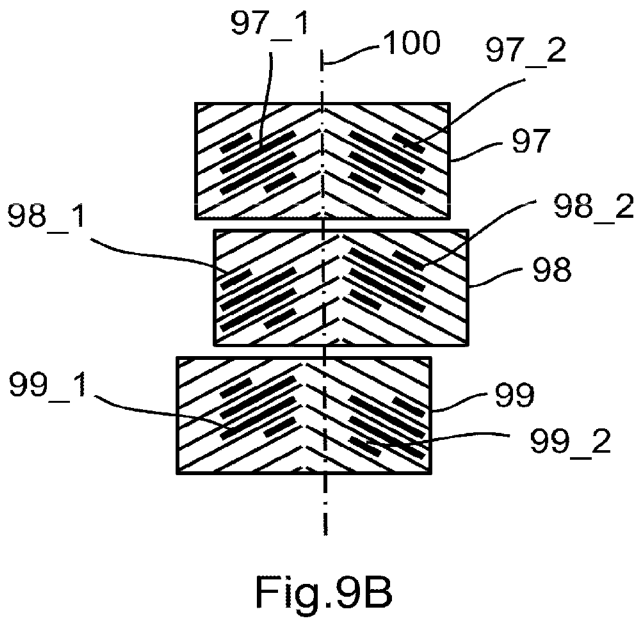
FIG. 9B is a cross-sectional view illustrating a change in the internal configuration of the control boss according to the rotation of the helical spline gear according to the position of the control boss of FIG. 8.

FIG. 9B is a cross-sectional view illustrating inner surfaces 97, 98, and 99 of the control boss 91 that are engaged in accordance with the rotation of the helical spline gears 93 and 94 according to the position of the control boss 91. FIG. 9B may be a cross-sectional view cut along the axial direction, illustrating the inner surface of the control boss 91. That is, the inner portion 98 of the control boss 91 represents a surface of the inner portion that is engaged with the helical spline gear 93 when the control boss 91 is moved to the right by the movement of the torsion bar portions 85 and 86. In addition, the inner portion 99 of the control boss 91 represents a surface of the inner portion that is engaged with the helical spline gear 94 when the control boss 91 is moved to the left by the movement of the torsion bar portions 85 and 86. In addition, the helical spline gears 93 and 94 may be moved upward or downward without moving in the axial direction.

The helical spline gears within the control boss 91 may be coupled to the helical spline gears 93 and 94 formed in the torsion bar portions 85 and 86. At this time, based on an inside center 100 of the control boss 91, the helical spline gears 93 and 94 may maintain a predetermined interval. The helical spline gears 93 and 94 may be rotated in place, but not movable in the axial direction, and the control boss 91 may be able to simultaneously rotate and move in the axial direction via the helical spline gears 93 and 94. When the control boss 91 only rotates without moving in the axial direction, the torsion bar portions 85 and 86 may be rotated in the same direction together with the respective helical spline gears 93 and 94 and the control boss 91. When there is torsion between the respective torsion bar portions 85 and 86, the torsion may be maintained without generating additional torsion, and the respective torsion bar portions 85 and 86 may be moved as if connected to each other.

When the control boss 91 is positioned in the central portion of the control boss carrier rail 95, the respective helical spline gears 93 and 94 may be positioned horizontally side by side with each other in the central portion of the inner portion 97 of the control boss 91. This may be the case in which the torsion bar portions 85 and 86 of the stabilizer bar have no torsion relative to each other.

When the control boss 91 is moved to the right in the axial direction without rotation, the helical spline gears 93 and 94 that cannot move together to the right may be slid along the inclination of the spline gear of the control boss 91 and moved upward and downward, as illustrated in the inner portion 98 of the control boss. This slippage may actually result in rotation. As illustrated, the respective helical spline gears 93 and 94 may be rotated in a direction opposite to the sliding direction.

When the control boss 91 is moved to the left in the axial direction without rotation, the helical spline gears 93 and 94 may be slid along the inclination of the helical spline gears of the control boss 91 and rotated as illustrated in the inner portion 99 of the control boss 91. In this case, again, the respective helical spline gears 93 and 94 may be rotated in opposite directions to each other. In addition, these directions of rotation may be opposite to when moving the control boss 91 to the right with respect to the axial direction.

The rotation of the helical spline gears 93 and 94 in opposite directions relative to each other may be equivalent to the rotation of the torsion bar portions 85 and 86 of the stabilizer bar in opposite directions relative to each other. This means that the torsion bar portions 85 and 86 of the stabilizer bar are twisted relatively more, and the degree of torsion may be proportional to the distance the control boss 91 is moved to the left or right with respect to the axial direction.

In an embodiment, during straight-driving of the car, the inner portion 97 of the control boss may have the contact surfaces of the helical spline gears 93 and 94 arranged horizontally side by side. Based on this, during left-cornering of the car, as the control boss 91 is moved to the right with respect to the axial direction, the left helical spline gear 93 may be positioned lower than the right helical spline gear 94 as in the inner portion 98 of the control boss. In addition, during right-cornering of the car, as the control boss 91 is moved to the left with respect to the axial direction, the right helical spline gear 94 may be positioned lower than the left helical spline gear 93 as in the inner portion 99 of the control boss. As described above, upward and downward changes in the relative position may mean that the relative rotation occurs.

While the movement in the axial direction and rotation of the control boss 91 have been separately described above, the present disclosure is not limited thereto, and the movement in the axial direction and rotation of the control boss 91 may occur simultaneously. That is, even when the respective helical spline gears 93 and 94 and the control boss 91 are rotated together with each other in the same direction as if they were fixedly connected, according to the movement of the control boss 91 in the axial direction, additional torsion may occur between the respective helical spline gears 93 and 94.

When torsion occurs between the respective helical spline gears 93 and 94 according to the movement of the control boss 91 in the axial direction, the direction in which the control boss 91 is moved and the direction in which the respective helical spline gears 93 and 94 are relatively twisted may also be related to the direction in which the helical spline gears 93 and 94 are twisted. When the directions of the twisting are reversed in FIGS. 9A-9B, according to the movement of the control boss 91, the directions in which the helical spline gears 93 and 94 are relatively twisted may also be reversed.

Causing relative torsion between the respective helical spline gears 93 and 94 by moving the control boss 91 left and right may be similar or identical to using a related stabilizer bar, that is, using a stabilizer bar with both sides relatively twisted from the beginning.

Figure 10A:
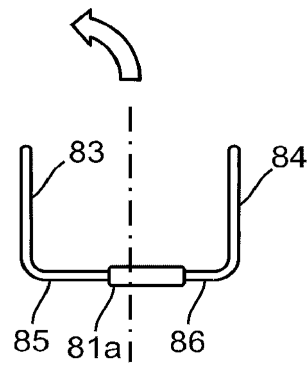
FIGS. 10A to 10C are exemplary views illustrating the movement of the spline shaft stabilizer of FIG. 8 according to the direction of the car during straight-driving or cornering.
Figure 10A:
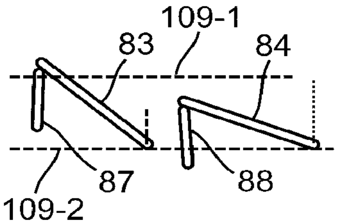
Figure 10A:
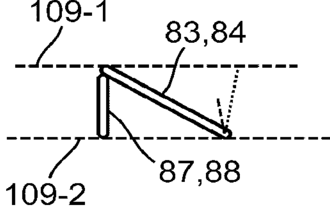
Figure 10B:
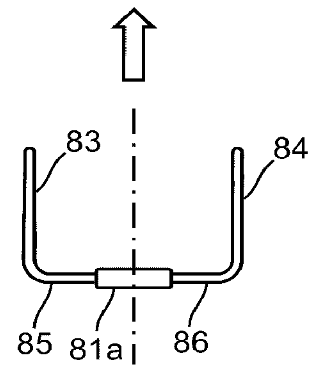
Figure 10B:
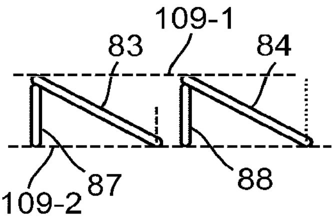
Figure 10B:
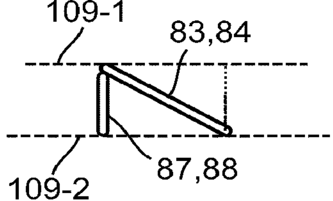
Figure 10C:
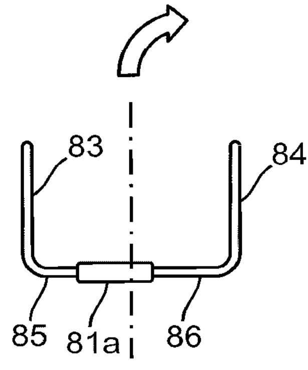
Figure 10C:
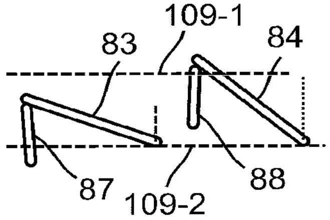
Figure 10C:
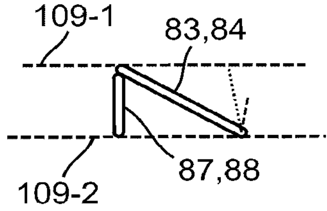

FIGS. 10A to 10C are exemplary views illustrating the movement of the spline shaft stabilizer 82 of FIG. 8 according to the direction of the car during straight-driving or cornering. As illustrated, FIG. 10A may illustrate a state of the traveling direction of the car during left-cornering, FIG. 10B may illustrate a state during straight-driving, and FIG. 10A may illustrate a state during right-cornering. The first rows of FIGS. 10A to 10C are plan views of the spline shaft stabilizer 82, illustrating the axial movement of the control boss 81 *a*. The second rows of FIGS. 10A to 10C illustrate the movement of the spline shaft stabilizer 82 when viewed from the side of the link 87 of the stabilizer 82. That is, the second rows of FIGS. 10A to 10C mainly represent the changes in heights of the respective connected links 87 and 88 when the arm portions 83 and 84 of the stabilizers are moved, without considering the load, the centrifugal force or springs of wheels applied to the car body. The third rows of FIGS. 10A to 10C represent the comparison of the movements of the connected arm portions 83 and 84, respectively, based on the assumption that the respective links 87 and 88 shown in the second rows are positioned at the same height.

In the second rows of FIGS. 10A to 10C, dotted lines 109-1 and 109-2 illustrated at the both ends of the arm portions 83 and 84 may be auxiliary lines drawn to compare the changes in heights according to the rotation of the arm portions 83 and 84.

The vertical dotted lines with different lengths as illustrated at the both ends of the first torsion bar portion 85 and the second torsion bar portion 86 in the second rows of FIGS. 10A to 10C may be auxiliary lines indicating the state of the torsion bar portions 85 and 86 before the rotation so that it is easily recognized the extent to which the torsion bar portions 85 and 86 are rotated in the third rows of FIGS. 10A to 10C.

In FIGS. 10A and 10C, the dotted lines having different lengths at the ends of the first torsion bar portion 85 and the second torsion bar portion 86 are illustrated non-parallel, which may represent the rotation of the corresponding lines according to the rotation of the torsion bar portions 85 and 86, indicating the extent to which the torsion bar portions 85 and 86 are twisted.

The first rows of FIGS. 10A to 10C illustrate the position of the twist control boss 91. In the first row of FIG. 10B, the position of the twist control boss 91 during straight-driving of the car is illustrated, in which the twist control boss 91 may be moved to the right side during left-cornering of the car, and may be moved to the left side during right-cornering of the car. The movement of the twist control boss 91 during left-cornering or right-cornering, may change according to the direction in which the helical spline gears 93 and 94 are twisted. The movement of the twist control boss 91 to the right or left may be caused by the drive device (not illustrated).

The second rows of FIGS. 10A to 10C illustrate the state without taking the load, centrifugal force or springs of wheels of the car into consideration. As illustrated in the second row of FIG. 10B, the respective arm portions 83 and 84 are in a state parallel to each other during straight driving of the car, and the heights of the respective links 87 and 88 may be the same as each other. As illustrated in the second row of FIG. 10A, during left-cornering of the car, the arm portions 83 and 84 may be in a relatively twisted state, and the height of the left link 87 may be higher. As illustrated in the second row of FIG. 10C, during right-cornering of the car, the height of the right link 88 may be higher as opposed to the second row of FIG. 10A.

The third rows of FIGS. 10A to 10C illustrate the movements of the respective torsion bar portions 85 and 86 when the heights of the respective links 87 and 88 match each other upon application of the load, centrifugal force or springs of wheels in the car. Referring to the second rows of FIGS. 10A to 10C, the respective torsion bar portions 85 and 86 that have been free of torsion are still not twisted during straight-driving of the car, but the respective torsion bar portions 85 and 86 may be twisted during cornering of the car.

In an embodiment, referring to the auxiliary line illustrated vertically in the second rows of FIGS. 10A to 10C, the respective torsion bar portions 85 and 86 are twisted by the angle widened by the rotation in the third rows of FIGS. 10A and 10C. As illustrated in FIG. 10B, the respective arm portions 83 and 84 remain parallel, and when the torsion bar portions 85 and 86 are not twisted, no torque may be generated. When the torsion bar portions 85 and 86 are twisted, torque may be generated in the torsion bar portions 85 and 86.

As illustrated in FIG. 10A, during left-cornering of the car, the left arm portion 83 generates an upward force that pushes from below, and the right arm portion 84 is twisted upward, generating a downward force. Accordingly, the left wheel is subjected to a force that makes it closer to the car body, and the right wheel is subjected to a force that makes it away from the car body. When the wheel is close to the car body, the car body is close to the road floor surface, and when the wheel is away from the car body, the car body is away from the road floor surface. Accordingly, the torque generated by the torsion bar portions 85 and 86 may cause the car to tilt to the left. This may offset the tendency of the car to tilt to the right under centrifugal force received during left-cornering of the car, thereby making the car tilt less or rather tilt to the left.

As illustrated in FIG. 10C, during right-cornering of the car, contrary the case of left-cornering, the stabilizer may be operated. By the torque generated from the torsion bar portions 85 and 86, the right wheel may be subjected to a force that makes it closer to the car body, and the left wheel may be subjected to a force that makes it away from the car body. That is, the car may tilt to the right. This tendency may offset the tendency of the car to tilt to the left under centrifugal force received during right-cornering of the car, thereby making the car tilt less or rather tilt to the left.

During left-cornering or right-cornering of the car, by the torque generated from the torsion bar portions 85 and 86, the inside wheel of the car during a turn may be subjected to a force that makes it closer to the car body, and the outside wheel may be subjected to a force that makes it away from the car body. This may make the car tilt less outward from the center of the turn by centrifugal force, or rather make tilt it inward.

In the second rows of FIG. 10B, since the respective arm portions 83 and 84 are parallel to each other and the respective links 87 and 88 have the same height, the torsion bar portions 85 and 86 that have been free of twisting may still be maintained in the no-twisting state in the third rows of FIG. 10B. In the absence of torsion as described above, the torsion bar portions 85 and 86 may not generate torque. Meanwhile, during cornering of the car, the fact that the outside wheel of the car is subjected to a large force from the stabilizer may mean that the elastic strength increases and the rigidity of the spring increases. In this case, the outside wheel may be very vulnerable to the impact of the obstacle, but considering that the centrifugal force is applied during cornering of the car, it may be better for the outside wheel to bounce than the inside wheel to bounce excessively. This is because the outside wheel can make the car body back down to the original position when it bounces due to centrifugal force, but the inside wheel can lift the bouncing car body further, thus interfering with the return.

For example, referring to FIGS. 1 and 5, depending on when the torsion bar 1 of FIG. 1 is positioned higher than the drive links 7 and 8, and when the torsion bar 51 of FIG. 5 is positioned higher than the drive link 7 and 8, the operation of the stabilizer illustrated in FIGS. 3 and 4, 6 and 7 may vary. In this case, the positions of the torsion bar 1 for the respective wheels may be changed in reverse. That is, it may be necessary that the components used to be installed in the front side of the car are installed in the rear side, and the components used to be installed in the rear side are installed in the front side. In this case, since the response of the inside wheel to impact is hard, and the response of the outside wheel is soft, the same effect by causing the car to tilt inward with respect to a turn of the car can be obtained equally. Compared with the spline shaft stabilizer 82, the 4-section link stabilizer 2 and the 3-section link stabilizer 52 may not have a possibility of the adjustments of torque generation from outside. However, with the spline shaft stabilizer 82, it is possible to adjust the torque generation by moving the control boss 91 from the outside. In addition, although the 4-section link stabilizer 2 and the spline shaft stabilizer 82 or the 3-section link stabilizer 52 and the spline shaft stabilizer 82 may be used at the same time, the wheels not using steering knuckle may be provided with a separate driving device, so that only the spline shaft stabilizer 82 may be used. Accordingly, the spline shaft stabilizer 82 may be used for the purpose of reducing the pitch due to the inertial force according to the acceleration/deceleration.

The centrifugal force generated during cornering of the car is proportional to the steering angle, but it may also be proportional to the driving speed. Accordingly, the spline shaft stabilizer 82 may be used adaptively in proportion to the traveling speed. The torsion bar portions 85 and 86 may be twisted during cornering or acceleration/deceleration of the car, from which a change in force and a change in the rigidity of the spring according to the torque generation can be expected. For this reason, by lowering the rigidity of the torsion bar itself, it may be possible to provide appropriate response even during straight-driving of the car. If necessary, the 4-section link stabilizer 2 and the 3-section link stabilizer 52 may have a torsion bar separately installed for each wheel, or one torsion bar may be fixed so as not be rotated in the center. That is, it is not necessary to connect each wheel to each other through the torsion bar, and in this case, even when there is an impact caused by the obstacle on one wheel, the shock applied to the other wheel through the torsion bar may be alleviated or prevented.

Figure 11A:
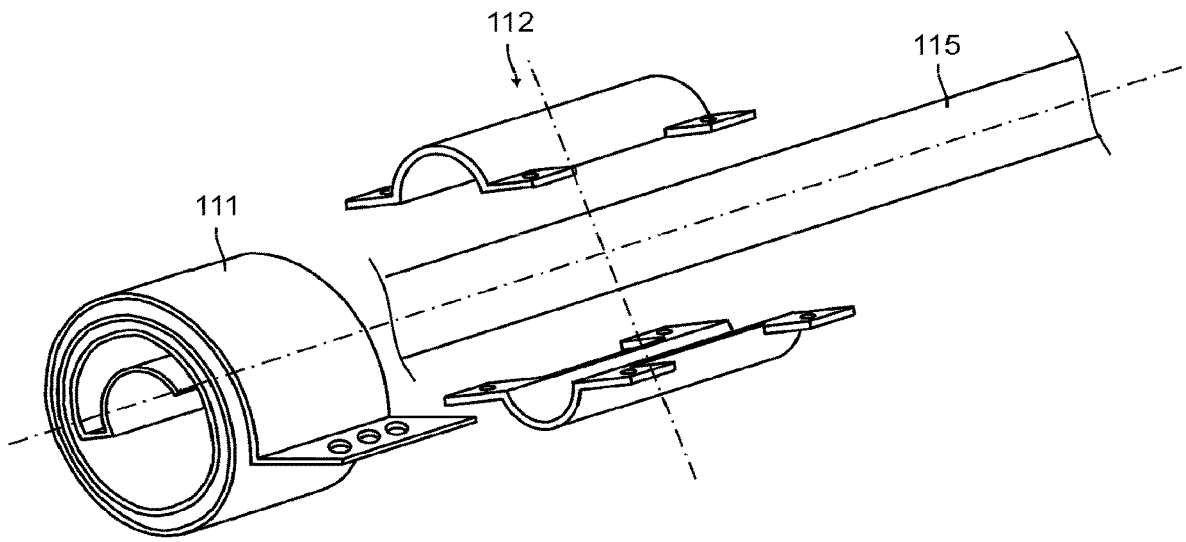
FIG. 11A is an exploded perspective view of a helical torsion and a bracket as a fixing device capable of fixing the stabilizer to the car body according to an embodiment.

FIG. 11A is an exploded perspective view of a helical torsion spring 111 and a bracket 112 as a fixing device capable of fixing a stabilizer to a car body according to an embodiment. As illustrated, the fixing device may include the helical torsion spring 111 and the bracket 112. The helical torsion spring 111 may be a spring capable of transmitting a rotational force to a shaft (e.g., a torsion bar portion 115) that is passed therethrough and connected therein. In addition, since the helical torsion spring 111 may provide supporting force in a three-dimensional direction with respect to the torsion bar portion 115, it may be used as a fixing device for fixing the stabilizer bar or the torsion bar portion 115 of the stabilizer bar to the car body. In particular, referring to FIG. 8, since the spline shaft stabilizer 82 is moved by the drive device by pushing the control boss 91 in the axial direction, it may be necessary to support the shaft connected to the center of the fixing device to prevent it from moving in the axial direction. For example, referring to FIG. 8, the helical torsion spring 111 may have the first and second torsion bar portions 85 and 86 passed therethrough and connected therein. At this time, the helical torsion spring 111 may be configured to transmit a rotational force to the first and the second torsion bar portions 85 and 86 and provide a supporting force in a three-dimensional direction, and fix the first and second torsion bar portions 85 and 86 to the car body. The bracket 112 may be configured to be coupled to the first and second torsion bar portions 85 and 86 to fix the helical torsion spring 111 to the car body.

While the helical torsion spring 111 allows torsion of the stabilizer, it does not use or allow slipping, and accordingly, lubrication is not required, and noise may not be generated during torsion as well.

Figure 11B:
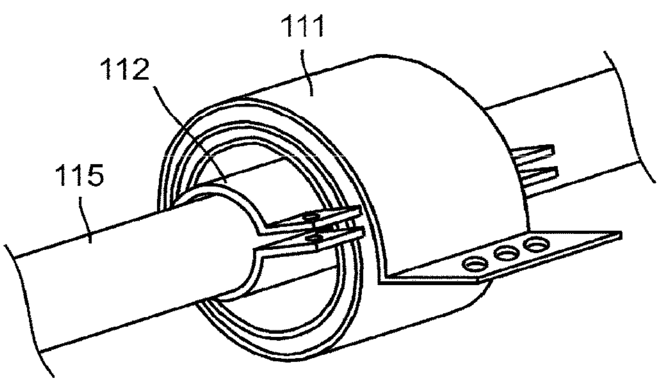
FIG. 11B is a perspective view illustrating an assembled state of the fixing device capable of fixing the stabilizer to the car body according to an embodiment.

FIG. 11B is a perspective view illustrating a fixing device capable of fixing a stabilizer to a car body according to an embodiment. The fixing device may include the helical torsion spring 111 and the bracket 112. As illustrated, the helical torsion spring 111 may be fixed to the torsion bar portion 115 of the stabilizer bar through the bracket 112. For convenience of explanation, bolts and nuts for fixing the bracket 112, screws for fixing the helical torsion spring 111 to the car body, the car body, or the like are not illustrated, but it will be understood that components necessary for coupling the helical torsion spring 111 and the bracket 112 to the car body may be additionally used. The stabilizer bar or the torsion bar portion 115 of the stabilizer bar may be fixed to the helical torsion spring 111 using the bracket 112 and bolts and nuts, but the present disclosure is not limited thereto, and it may be coupled by welding or strong pressure.

Figure 12A:
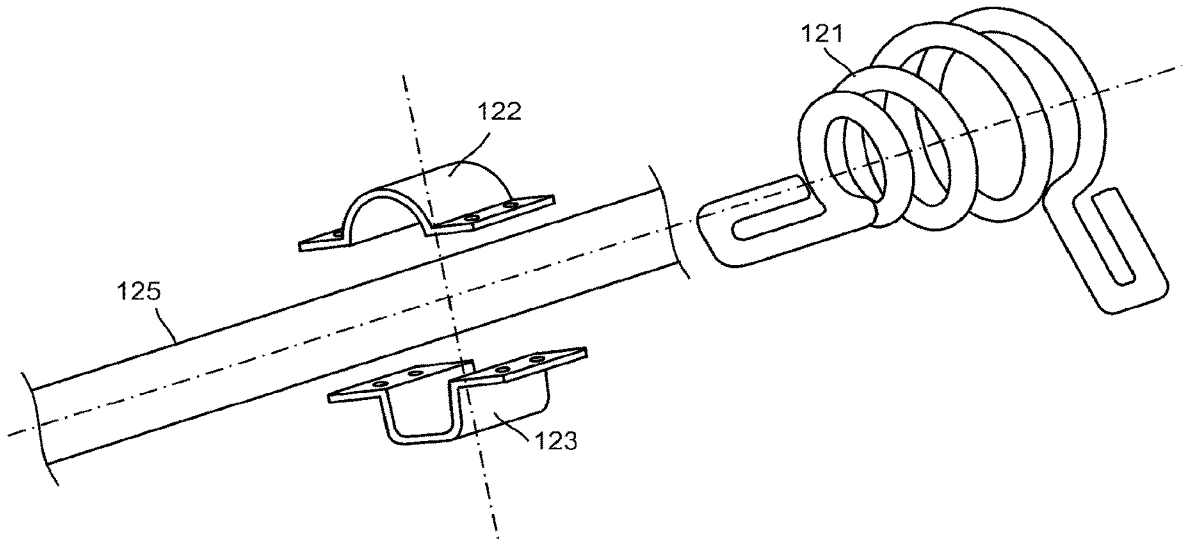
FIG. 12A is an exploded perspective view of a torsion coil and the bracket as a fixing device capable of fixing the stabilizer to the car body according to an embodiment.

FIG. 12A is an exploded perspective view of a torsion coil spring 121 and the bracket 112 as a fixing device capable of fixing a stabilizer to a car body according to an embodiment. As illustrated, the fixing device may include the torsion coil spring 121 and brackets 122 and 123. The torsion coil spring 121 may be a spring capable of transmitting a rotational force to a shaft (e.g., a torsion bar portion 125) that is passed therethrough and connected therein. In addition, since the torsion coil spring 121 may provide supporting force in a three-dimensional direction with respect to the torsion bar portion 125, it may be used as a fixing device for fixing the stabilizer bar or the torsion bar portion 125 of the stabilizer bar to the car body.

Figure 12B:
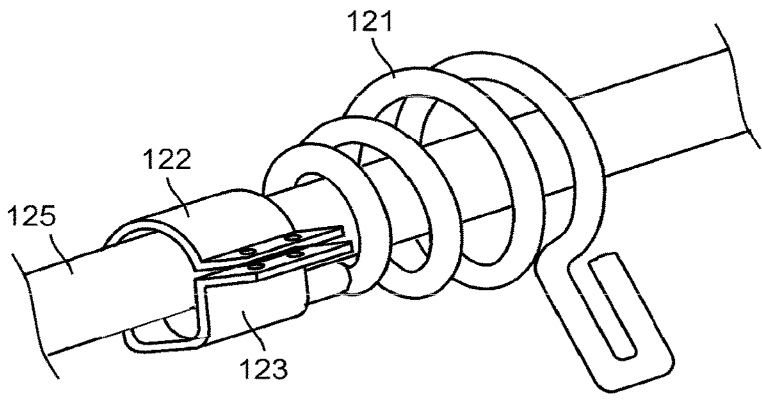
FIG. 12B is a perspective view illustrating an assembled state of the fixing device capable of fixing the stabilizer to the car body according to an embodiment.

FIG. 12B is a perspective view illustrating another example of a fixing device capable of fixing a stabilizer to a car body according to an embodiment. The fixing device may include the torsion coil spring 121 and the brackets 122 and 123. As illustrated, the fixing device may be fixed to the torsion bar portion 125 of the stabilizer bar. In FIG. 12B, bolts and nuts for fixing the brackets 122 and 123, screws for fixing the torsion coil spring 121 to the car body, and the car body are not illustrated, but it is to be understood that the present disclosure is not limited thereto, and components necessary for coupling the torsion coil spring 121 and the brackets 122 and 123 to the car body may be additionally used.

The torsion coil spring 121 may be a spring capable of transmitting a rotational force to a shaft that is passed therethrough and connected therein. In addition, since the torsion coil spring 121 can provide supporting force in a three-dimensional direction, it may be used as a fixing device for fixing the stabilizer bar or the torsion bar portion 125 of the stabilizer bar to the car body. While the torsion coil spring 121 itself allows torsion, it does not use or allow slipping, and accordingly, the torsion coil spring does not required lubrication or generate noise during torsion, and can be prevented from being pushed in the axial direction. As an example, referring to FIG. 8, it may be configured such that a rotational force is transmitted to the first and second torsion bar portions 85 and 86 that are passed through and connected in the torsion coil spring 121, and a supporting force in a three-dimensional direction is provided to fix it to the car body. The brackets 122 and 123 may be coupled to the first and second torsion bar portions 85 and 86 to fix the torsion coil spring 121 to the car body.

As illustrated, it may be possible to couple the bracket 122 to the stabilizer bar or the torsion bar portion 125 of the stabilizer bar to fix it to the torsion coil spring 121. The bracket 122 may be fixed to the torsion coil spring 121 using bolts and nuts, but the present disclosure is not limited thereto, and it may be coupled through welding or strong pressure.

Figure 13A:
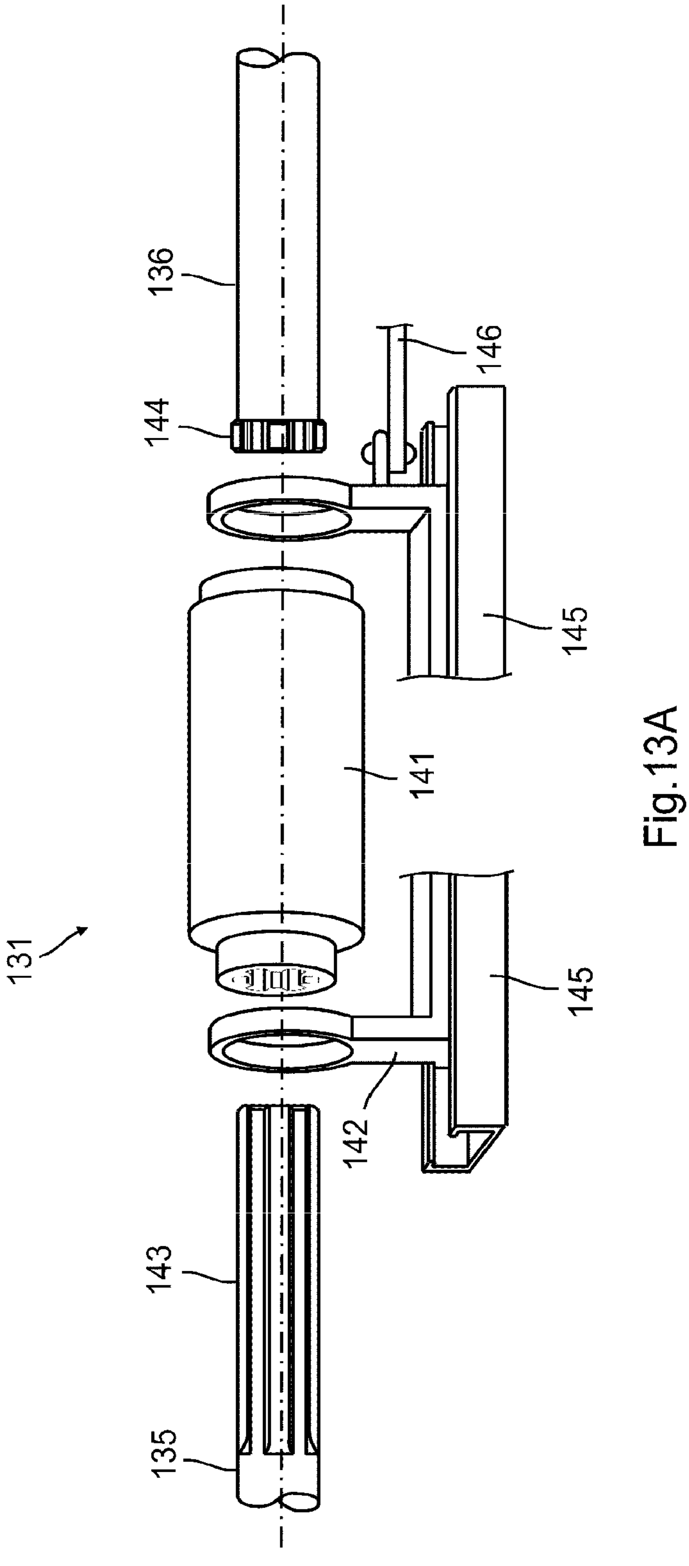
FIG. 13A is an exploded perspective view of a stabilizer including an elastic control device according to an embodiment.

FIG. 13A is an exploded perspective view of an elastic control device 131, which is one of the spline shaft control devices 81 as illustrated in FIG. 8, according to an embodiment. The elastic control device 131 may include an elastic control boss 141, an elastic control boss carrier 142, an elastic control boss carrier rail 145, and an elastic control boss carrier drive rod 146. The elastic control boss carrier rail 145 may be formed with a rail-shaped groove on one surface, and the elastic control boss carrier 142 may be configured to be mounted in the groove of the elastic control boss carrier rail 145 and moved in the axial direction. The elastic control boss carrier drive rod 146 may be configured to be connected to a drive device (not illustrated) to move the elastic control boss carrier rail 145 in the axial direction.

Spline gears 143 and 144 may be formed at opposite ends of torsion bar portions 135 and 136 of the stabilizer bar. As an example, the first spline gear 143 may have a different length from the second spline gear 144, and may be formed within the elastic control boss 141, and the lengths of the elastic control boss spline gears, which are configured such that the spline gears 143 and 144 are engaged with and inserted therein, may also be different from each other.

The elastic control boss 141 may be mounted in the groove of the elastic control boss carrier rail 145 to be moved by the elastic control boss carrier 142 moving in the axial direction. The elastic control device 131 may serve to move the elastic control boss 141 in the axial direction simultaneously with rotation.

Figure 13B:
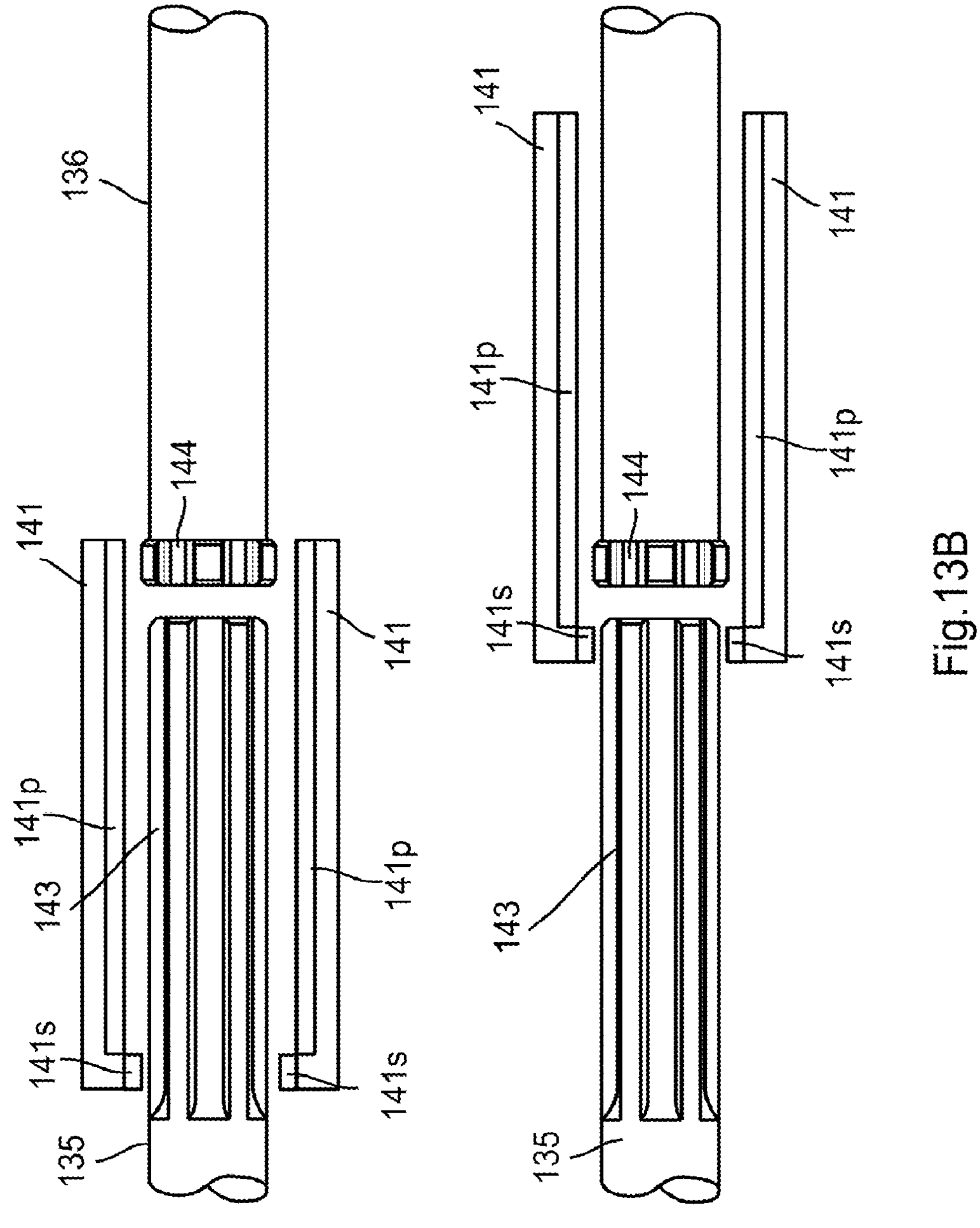
FIG. 13B is a cross-sectional view illustrating a change in the role of the torsion bar of the left spline gear according to the position of the elastic control boss in the elastic control device of FIG. 13A.

FIG. 13B is a cross-sectional view illustrating a change in the role of the torsion bar of the left spline gear 143 according to the position of the elastic control boss 141 in the elastic control device of FIG. 13A. As illustrated, the two spline gears 143 and 144 inserted into the elastic control boss 141 may be arranged at a predetermined interval. Referring back to FIG. 13A, the elastic control boss 141 may be movable in the axial direction using the elastic control boss carrier rail 145 by the elastic control boss carrier 142, the elastic control boss carrier drive rod 146, and the drive device connected to the elastic control boss carrier drive rod 146. The elastic control boss carrier rail 145 may be fixed to the car body. The drive device (not illustrated) may be an actuator including a hydraulic device, an actuator including an electric motor and a screw shaft, and the like.

The length of the left spline gear 143 may be longer than that of the right spline gear 144. Elastic control boss spline gears 141 *s* and 141 *p* may be formed within the elastic control boss 141, and the elastic control boss spline gear 141 *s* on the left side may be shorter than the elastic control boss spline gear 141 *p* on the right side. In addition, the left elastic control boss spline gear 141 *s* may have a radius smaller than or equal to the right elastic control boss spline gear 141 *p*. The spline gears 143 and 144 are assembled at both ends of the elastic control boss 141 to be moved in the axial direction. The respective the spline gears 143 and 144 may maintain a predetermined interval within the elastic control boss 141. The elastic control boss 141 may be provided to be rotated together with the respective spline gears 143 and 144, connecting the respective spline gears 143 and 144 to each other, and may be moved in the central or axial direction, and the like. As the elastic control boss 141 is moved in the axial direction, the positions where the elastic control boss spline gears 141 *s* and 141 *p* and the spline gears 143 and 144 are engaged with each other may be changed. Accordingly, the contribution of the left spline gear 143 serving as a torsion bar may vary.

Figure 13C:
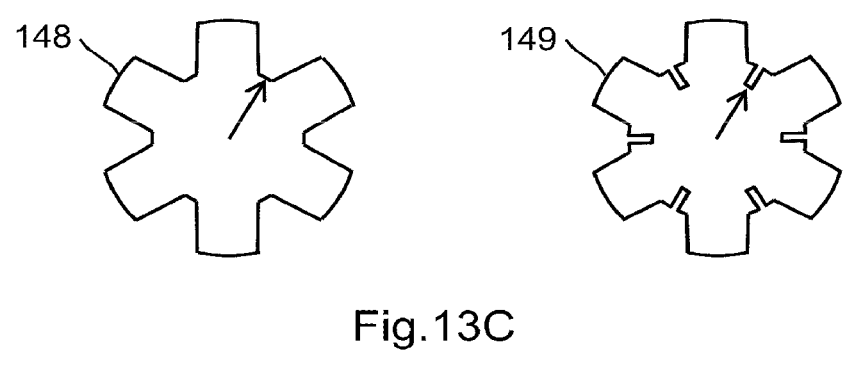

FIG. 13C is a cross-sectional view illustrating examples of the cross-sectional shape of the left spline gear 143 in the elastic control device of FIG. 13A. The left spline gear 143 may have a smaller effective radius for determining rigidity, when acting as a torsion bar compared to the torsion bar portion 135 of the stabilizer bar. As illustrated, among the examples of the two end surfaces 148 and 149 of the left spline gear 143, the cross-section 148 on the left side may have a deeper valley than the cross-section 149 on the right side. That is, the right-hand cross-section 149 may have a narrower valley and a deeper groove than the left-hand cross-section 148. This illustrates an example of how to lower the elastic modulus by decreasing the effective radius of the material acting as a torsion bar that can resist the force by torsion when the left spline gear 143 is subjected to the force by torsion. In addition, this may be used as a method of lowering the rigidity that determines the torsion angle when a torsion force is applied, and the rigidity may be adjusted to be reduced through various methods such as heat treatment of the left spline gear 143 portion, and the like. When the contribution as the torsion bar of the left spline gear 143 having a small elastic modulus and low rigidity increases, the overall elasticity of the stabilizer bar may decrease.

In an embodiment, a first spline gear and a second spline gear may be formed on the two torsion bar portions 135 and 136, and the length of the first spline gear may be configured to be longer than that of the second spline gear. The first spline gear may be configured such that the spline gear has narrower valleys and deeper grooves than the second spline gear. This may decrease the elastic modulus by adjusting the effective radius of the width of the spline gear to be small such that the spline gear may resist the force caused by torsion. Meanwhile, although it is described that the first spline gear is configured to have a longer length, narrower valleys and deeper grooves of the gear than the second spline gear, the present disclosure is not limited thereto. For example, the second spline gear may be configured to have a longer length, narrower valleys and deeper grooves of the gear than the first spline gear.

In general, when the spline gear formed in the torsion bar portion is made of a linear elastic material, the torsion angle may be $$\varphi = \frac{TL}{GJ} \text{ and } J = \frac{\pi r4}{2},$$

where the cross-sectional radius is r, the length of the member is L, the shear elastic modulus is G, and the torsion constant is J. This may mean that when the cross-sectional radius of the material is halved, the torsion constant is reduced to 1/16, and the torsion angle is increased by 16 times. When the length used as the torsion bar is changed in the left spline gear 143 made of this material, L in the above equation is changed, and accordingly the torsion angle φ may be changed.

Referring again to FIGS. 13A and 13B, the left spline gear 143 and the right spline gear 144 is rotatable in place, but may not be movable in the axial direction. The elastic control boss 141 may be rotated together with the two spline gears 143 and 144 and may be movable in the axial direction. What is changed as the elastic control boss 141 is moved in the axial direction is only the position where the left elastic control boss spline gear 141 *s* and the left spline gear 143 are engaged with each other, and torsion or force by the torsion between the left spline gear 143 and the right spline gear 144 may be transmitted to both sides without filtration. By having a position where the left spline gear 143 is engaged with the left elastic control boss spline gear 141 *s* as a boundary, the right side may be free of torsion, may not be subjected to the force caused by torsion, and may not serve as the torsion bar. The left side may be subjected to the force caused by the torsion, may have torsion, and may serve as the torsion bar. The left spline gear 143 may have lower rigidity than the torsion bar portions 135 and 136 of the stabilizer bar. Therefore, it can be said that the overall elasticity of the stabilizer bar decreases as the portion where the left spline gear 143 serves as the torsion bar increases, because the angle of torsion for the same force increases. That is, the overall elasticity of the stabilizer bar may be changed according to the left and right movement of the elastic control boss 141.

Referring back to FIG. 8, for the stabilizer 82, not only the spline shaft stabilizer but also other types of stabilizers may be used at the same time. When both the elastic control stabilizer and the spline shaft stabilizer are used as the stabilizer 82, the two stabilizers may be installed in series to the torsion bar portions 85 and 86 respectively and used.

In an embodiment, when assuming that the length of the torsion bar is 1 m, the radius is 0.03 m, the turning force is 500 Nm, the shear elastic modulus of the material is 2,251, 581,859, and the GJ of the elastic control boss 141 is the same as the GJ of the torsion bar, the torsion constant J and the torsion angle φ may be expressed as follows, respectively.

$$J = \frac{\pi r4}{2} = 1.27235 \times 10^{-6} \quad \varphi = \frac{TL}{GJ} = 500 \times \frac{1}{\frac{2,251,581,859}{1.27235}} \times 10^{-6} = 0.1745 \text{ rad} = 10^\circ$$

Here, when a spline gear of 0.1 m manufactured with the torsion bar 0.9 m in length and the effective radius of 0.015 m is connected, the torsion constant K and the torsion angle φ of the spline gear are expressed as follows.

$$K = \frac{L}{16} = 7.9521 \times 10^{-8}$$

$$\varphi = \frac{TL_1}{GJ} + \frac{TL_2}{GK} = 500 \times \frac{0.9}{\frac{2,251,581,859}{1.27235}} \times 10^{-8} + 500 \times \frac{0.1}{\frac{2,251,581,859}{7.9521}} \times 10^{-8} = 0.4363 \text{ rad} = 25^\circ$$

When a spline gear of 0.2 m manufactured with the torsion bar 0.8 m in length and the effective radius of 0.015 m is connected, the torsion angle φ is expressed as follows.

$$\varphi = \frac{TL_1}{GJ} + \frac{TL_2}{GK} = 500 \times \frac{0.8}{\frac{2,251,581,859}{1.2735}} \times 10^{-8} + 500 \times \frac{0.2}{\frac{2,251,581,859}{7.9521}} \times 10^{-8} = 0.698 \text{ rad} = 40^\circ$$

According to the above equations, it can be seen that, with respect to the turning force of 500 Nm, the torsion angle may be increased by decreasing the length of the torsion bar and increasing the length of the spline gear. As described above, an increase in the torsion angle with respect to the same turning force may mean a decrease in the elasticity of the entire torsion bar.

Figure 14:
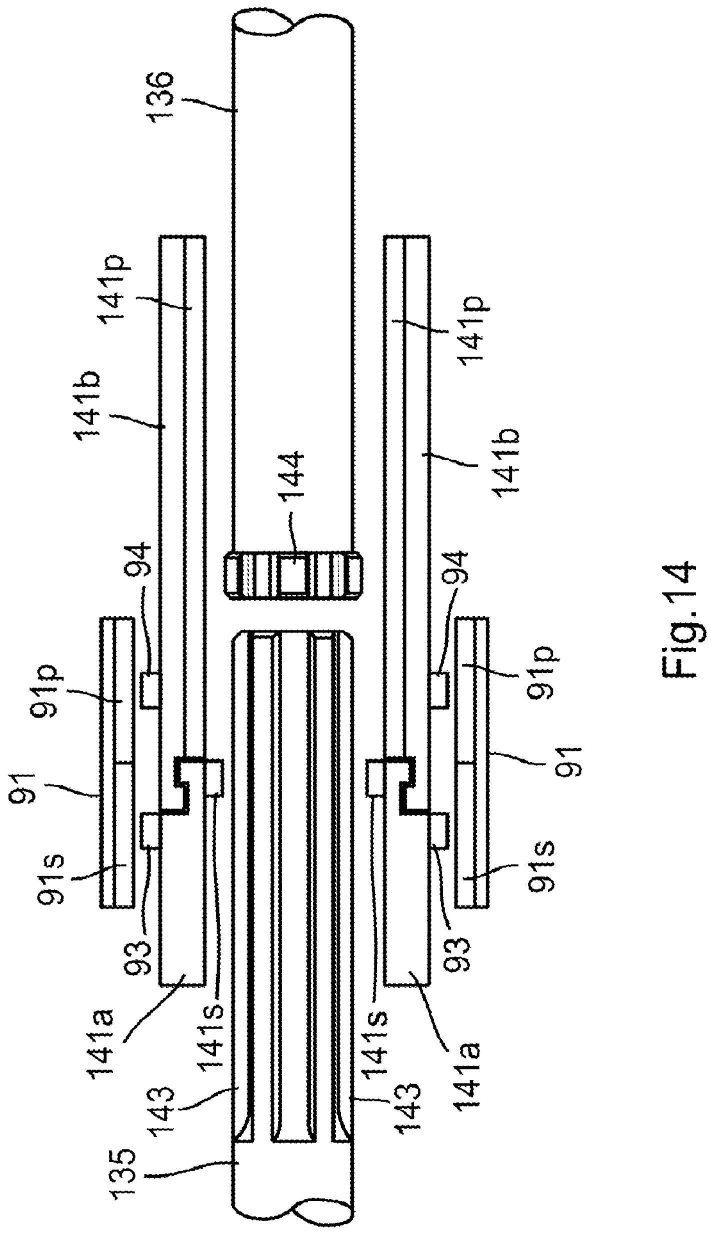
FIG. 14 is a cross-sectional view illustrating a stabilizer configured to use both the spline shaft control device of FIG. 8 and the elastic control device of FIG. 13A at the same time.

FIG. 14 is a cross-sectional view illustrating a stabilizer configured to use both the twist control device 101 of FIG. 9A and the elastic control device 131 of FIG. 13A at the same time. In an embodiment, the twist control stabilizer and the elastic control stabilizer illustrated in FIGS. 8 to 13C may be used at the same time. For example, when the twist control device 101 and the elastic control device 131 are configured in a coaxial form, the spline gears 143 and 144 may be installed in the torsion bar portions 135 and 136. Elastic control bosses 141 *a* and 141 *b*, which are two portions divided from the elastic control boss 141 by deforming, may be installed on the outside of the spline gears 143 and 144. Then, the twist control boss 91 may be installed on the outside of the elastic control bosses 141 *a* and 141 *b*. The left elastic control boss spline gear 141 *s* may be positioned inside the left elastic control boss 141 *a*. In addition, the right elastic control boss spline gear 141 *p* may be positioned inside the right elastic control boss 141 *b*, and the two elastic control bosses 141 *a* and 141 *b* may be connected to each other to be prevented from rotating idly. The left helical spline gear 93 may be installed outside the left elastic control boss 141 *a*. In addition, the right helical spline gear 94 may be installed outside the right elastic control boss 141 *b* to be engaged with respective twist control boss gears 91 *s* and 91 *p* installed within the outside twist control boss 91, respectively. The two elastic control bosses 141 *a* and 141 *b* may adjust the elasticity through relative movement with respect to the car body in the axial direction, and the twist control boss 91 may adjust relative torsion between the two control bosses 141 *a* and 141 *b* through relative movement with respect to the two elastic control bosses 141 *a* and 141 *b* in the axial direction. The relative torsion generated between the two elastic control bosses 141 *a* and 141 *b* may be transmitted to the two spline gears 143 and 144 as it is, to adjust the relative torsion between the two torsion bar portions 135 and 136. When the two elastic control bosses 141 *a* and 141 *b* adjust the elasticity through relative movement with respect to the car body in the axial direction, the control boss 91 may be moved in the same manner as the two elastic control bosses 141 *a* and 141 *b*. In addition, when the twist control boss 91 adjusts the relative torsion between the two elastic control bosses 141 *a* and 141 *b*, the two elastic control bosses 141 *a* and 141 *b* may not be moved in the axial direction. Although there are various methods for the twist control boss 91 to make relative movement with respect to the elastic control bosses 141 *a* and 141 *b*, the control boss carrier rail 95 may be installed on an upper end of at least one elastic control boss 141 *a* or 141 *b*. Alternatively, a brake cable or a wire bending cable (or Bowden cable) having an appearance commonly used in bicycles may be used. For example, like the method used in bicycle caliper brakes, it may be possible to pull the inner cable with a spring and separately fix the inner cable and the outer cable to the twist control boss 91 and the elastic control boss 141 *a* or 141 *b*, and make adjustment by the process of pulling and stretching the inner cable.

In the present disclosure, a connection mechanism or device that enables bending in all directions at a central point is referred to as a "omni-direction bendable connection mechanism". The ball joints used in the embodiments of the present disclosure may be used as an example of the "omni-direction bendable connecting mechanism". However, when the angle of bending is small, a softer material such as a bushing may be used as a substitute for the ball joint.

In the present disclosure, a connection mechanism or device that enables bending in both directions at the centerline is referred to as a "bi-directional bending connection mechanism". Various hinges used in the embodiments of the present disclosure may be used as an example of the "bi-directional bending connection mechanism". However, when the angle of bending is small, elastic materials such as a leaf spring and the like may be used as a substitute for the hinge.

In addition, in the present disclosure, the omni-directional bending connection mechanism and the bi-directional bending connection mechanism are collectively referred to as a "connection mechanism". In the present disclosure, components expressed with "connect", "combine" or "install", and the like without a separate description may be those that are connected, coupled, or installed with any one of these connection mechanisms.

It should be understood that the embodiments of the present disclosure described above are disclosed for the purpose of illustration, and those skilled in the art with ordinary knowledge of the present disclosure will be able to make various modifications, changes and additions within the spirit and scope of the present disclosure, and such modifications, changes and additions are within the scope of the claims.

What is claimed is:

1. A stabilizer for a vehicle, comprising:

a ball joint that enables three-dimensional rotation;

an arm link hinge that enables rotation with respect to an axis of the arm link hinge without bending;

a torsion link hinge that enables rotation with respect to an axis of the torsion link hinge without bending, wherein one end of the torsion link hinge is fixed to a vehicle body;

a drive link, wherein one end of the drive link is fixed to one of a strut assembly or a steering knuckle of one side of the vehicle, and the other end of the drive link is connected to one end of the ball joint;

a torsion link, wherein one end of the torsion link is connected to one end of the arm link hinge, and the other end of the torsion link is connected to the other end of the torsion link hinge; and an arm link, wherein one end of the arm link is connected to the other end of the ball joint, and the other end of the arm link is connected to the other end of the arm link hinge;

wherein the torsion link hinge is configured to allow an angle between the torsion link and the vehicle body to be changed, and the arm link hinge is configured to allow an angle between the arm link and the torsion link to be changed, and the drive link and the torsion link are positioned at different heights so that the arm link is inclined with respect to a plane of rotation of the drive link, wherein the ball joint, the arm link, the arm link hinge, and the torsion link are configured to move forward or backward of the vehicle according to the rotation of the drive link, thereby changing a distance between the ball joint and the torsion link hinge, causing the torsion link to twist and generating a torque, and wherein the torque applies a vertical force to the drive link, a magnitude of the vertical force varying as a function of the distance between the ball joint and the torsion link hinge.

2. The stabilizer according to claim 1, further comprising:

a torsion bar configured to twist with respect to a longitudinal axis of the torsion bar, wherein one end of the torsion bar is fixed to the vehicle body, and the other end of the torsion bar is connected to one end of the torsion link hinge;

wherein the torsion link hinge is configured to allow an angle between the torsion link and the torsion bar to be changed, and the torsion link and the torsion bar are configured to twist and thereby generate the torque.

3. The stabilizer according to claim 2, further comprising:

a supplemental ball joint that enables three-dimensional rotation;

a supplemental arm link hinge that enables rotation with respect to an axis of the supplemental arm link hinge without bending;

a supplemental torsion link hinge that enables rotation about an axis of the supplemental torsion link hinge without bending, wherein one end of the supplemental torsion link hinge is connected to one end of the torsion bar;

a supplemental drive link, wherein one end of the supplemental drive link is fixed to one of a supplemental strut assembly or a supplemental steering knuckle of the other side of the vehicle, and the other end of the supplemental drive link is connected to one end of the supplemental ball joint;

a supplemental torsion link, wherein one end of the supplemental torsion link is connected to one end of the supplemental arm link hinge, and the other end of the supplemental torsion link is connected to the other end of the supplemental torsion link hinge; and a supplemental arm link, wherein one end of the supplemental arm link is connected to the other end of the supplemental ball joint, and the other end of the supplemental arm link is connected to the other end of the supplemental arm link hinge;

wherein the supplemental torsion link hinge is configured to allow an angle between the supplemental torsion link and the torsion bar to be changed, and the supplemental arm link hinge is configured to allow an angle between the supplemental arm link and the supplemental torsion link to be changed, and the supplemental drive link and the supplemental torsion link are positioned at different heights so that the supplemental arm link is inclined with respect to a plane of rotation of the supplemental drive link, wherein the supplemental ball joint, the supplemental arm link, the supplemental arm link hinge, and the supplemental torsion link are configured to move forward or backward of the vehicle according to the rotation of the supplemental drive link, thereby changing a distance between the supplemental ball joint and the supplemental torsion link hinge, causing the supplemental torsion link and the torsion bar to twist and generating the torque, and wherein the torque applies a vertical force to the supplemental drive link, a magnitude of the force varying as a function of the distance between the supplemental ball joint and the supplemental torsion link hinge.

4. A stabilizer for a vehicle, comprising:

a ball joint that enables three-dimensional rotation;

an arm link sliding hinge that enables rotation with respect to an axis of the arm link sliding hinge without bending, wherein one end of the arm link sliding hinge is configured to provide a movable connecting point;

a drive link, wherein one end of the drive link is fixed to one of a strut assembly or a steering knuckle of one side of the vehicle, and the other end of the drive link is connected to one end of the ball joint;

a torsion bar, wherein one end of the torsion bar is fixed to a vehicle body, and the other end of the torsion bar is connected to the other end of the arm link sliding hinge; and an arm link, wherein one end of the arm link is connected to the other end of the ball joint, and the other end of the arm link is connected to one end of the arm link sliding hinge;

wherein the movable connecting point of the other end of the arm link is configured to be movable through the arm link sliding hinge, wherein the arm link sliding hinge is configured to allow an angle between the arm link and the torsion bar to be changed, and the drive link and the torsion bar are positioned at different heights so that the arm link is inclined with respect to a plane of rotation of the drive link, and wherein the ball joint and the arm link are configured to move forward or backward of the vehicle according to the rotation of the drive link, thereby changing a distance between the ball joint and the arm link sliding hinge, causing the torsion bar to twist and generating a torque, wherein the torque applies a vertical force to the drive link, a magnitude of the vertical force varying as a function of the distance between the ball joint and the arm link sliding hinge.

5. The stabilizer according to claim 4, further comprising:

a supplemental ball joint that enables three-dimensional rotation;

a supplemental arm link sliding hinge that enables rotation about an axis of the supplemental arm link sliding hinge without bending, wherein one end of the supplemental arm link sliding hinge is configured to provide a movable connecting point;

a supplemental drive link, wherein one end of the supplemental drive link is fixed to one of a supplemental strut assembly or a supplemental steering knuckle of the other side of the vehicle, and the other end of the supplemental drive link is connected to one end of the supplemental ball joint; and a supplemental arm link, wherein one end of the supplemental arm link is connected to the other end of the supplemental ball joint, and the other end of the supplemental arm link is connected to one end of the supplemental arm link sliding hinge, wherein the movable connecting point of the other end of the supplemental arm link is configured to be movable through the supplemental arm link sliding hinge;

wherein one end of the torsion bar is connected to the other end of the supplemental arm link sliding hinge, and the supplemental arm link sliding hinge is configured to allow an angle between the supplemental arm link and the torsion bar to be changed, and the supplemental drive link and the torsion bar are positioned at different heights so that the supplemental arm link is inclined with respect to a plane of rotation of the supplemental drive link, and wherein the supplemental ball joint and the supplemental arm link are configured to move forward or backward of the vehicle according to the rotation of the supplemental drive link, thereby changing a distance between the supplemental ball joint and the supplemental arm link sliding hinge, causing the torsion bar to twist and thereby generate the torque, wherein the torque applies a vertical force to the supplemental drive link, a magnitude of the vertical force varying as a function of the distance between the supplemental ball joint and the supplemental arm link sliding hinge.

* * * * *